(12) United States Patent
Kwasnick et al.

(10) Patent No.: US 10,114,981 B2
(45) Date of Patent: Oct. 30, 2018

(54) ARCHITECTURE FOR TELEMETRY AND ADAPTIVE LIFETIME CONTROL OF INTEGRATED CIRCUITS

(71) Applicant: Intel Corporation, Santa Clara, CA (US)

(72) Inventors: Robert F. Kwasnick, Palo Alto, CA (US); Suraj Sindia, Hillsboro, OR (US); Clark N. Vandam, Hillsboro, OR (US); Balkaran Gill, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,561

(22) Filed: Dec. 31, 2016

(65) Prior Publication Data
US 2018/0189522 A1    Jul. 5, 2018

(51) Int. Cl.
*G06F 21/70* (2013.01)
*G06N 3/02* (2006.01)
(Continued)

(52) U.S. Cl.
CPC ............... *G06F 21/70* (2013.01); *G06N 3/02* (2013.01); *H04L 29/08099* (2013.01); *H04L 12/2803* (2013.01); *H04L 12/2816* (2013.01); *H04L 12/2818* (2013.01); *H04L 12/2825* (2013.01); *H04L 12/2827* (2013.01); *H04L 43/065* (2013.01); *H04L 43/08* (2013.01); *H04Q 9/00* (2013.01)

(58) Field of Classification Search
CPC .. G06F 21/70; G06N 3/02; H04Q 9/00; H04L 12/2816; H04L 12/2823; H04L 12/2825; H04L 12/2827; H04L 12/2803; H04L 12/2818; H04L 43/06; H04L 43/065; H04L 43/08; H04L 43/10; H04L 43/103; H04L 43/16; H04L 29/08099
See application file for complete search history.

(56) References Cited

U.S. PATENT DOCUMENTS

| | | | |
|---|---|---|---|
| 6,510,350 B1 * | 1/2003 | Steen, III | G05B 15/02 700/9 |
| 8,768,530 B2 * | 7/2014 | Liang | G05D 23/1932 318/471 |

(Continued)

*Primary Examiner* — Nelson Giddins
(74) *Attorney, Agent, or Firm* — Nicholson De Vos Webster & Elliott LLP

(57) ABSTRACT

Apparatus, method, and system for remotely affecting the functionality and lifetime of an integrated circuit are described herein. One embodiment of a method includes: tracking a plurality of operational metrics relating to a monitored device, sending one or more of the plurality of operational metrics to a remote monitor and responsively receiving a command generated by the remote monitor, generating a threat level based on the plurality of operational metrics and the command, and performing a derating action based on the threat level. The command from the remote monitor may be generated by the remote monitor based, at least in part, on the one or more of the plurality of operational metrics. Alternatively, the command may be generated based on information obtained independently by the remote monitor and not based on the one or more of the plurality of operational metrics.

19 Claims, 20 Drawing Sheets

(51) Int. Cl.
*H04Q 9/00* (2006.01)
*H04L 12/28* (2006.01)
*H04L 12/26* (2006.01)
*H04L 29/08* (2006.01)

(56) References Cited

U.S. PATENT DOCUMENTS

| | | | | |
|---|---|---|---|---|
| 9,425,627 B2* | 8/2016 | Proud | | H01F 38/14 |
| 9,465,664 B1* | 10/2016 | Miller | | G06F 9/5038 |
| 9,642,529 B1* | 5/2017 | Siddiqui | | A61B 5/0008 |
| 9,644,911 B1* | 5/2017 | McLean, III | | F41A 17/063 |
| 9,655,801 B2* | 5/2017 | Timme | | A61G 11/00 |
| 9,859,830 B2* | 1/2018 | Durham | | H02P 23/0077 |
| 9,872,250 B2* | 1/2018 | Nicks | | H04W 52/0229 |
| 2002/0145515 A1* | 10/2002 | Snowbarger | | G05B 9/02 |
| | | | | 340/514 |
| 2002/0186691 A1* | 12/2002 | Bristow | | B60R 25/1003 |
| | | | | 370/389 |
| 2006/0259163 A1* | 11/2006 | Hsiung | | G05B 15/02 |
| | | | | 700/30 |
| 2008/0195677 A1* | 8/2008 | Sudhakar | | G06F 17/3023 |
| 2009/0195237 A1* | 8/2009 | Feliss | | B60L 3/0069 |
| | | | | 323/318 |
| 2009/0195369 A1* | 8/2009 | Fischbach | | B60R 25/04 |
| | | | | 340/426.11 |
| 2010/0211745 A1* | 8/2010 | Jeddeloh | | G06F 1/3203 |
| | | | | 711/137 |
| 2010/0228854 A1* | 9/2010 | Morrison | | H04L 29/00 |
| | | | | 709/224 |
| 2010/0272447 A1* | 10/2010 | Kolze | | H04B 10/25751 |
| | | | | 398/192 |
| 2011/0301778 A1* | 12/2011 | Liang | | G05D 23/1932 |
| | | | | 700/299 |
| 2012/0229295 A1* | 9/2012 | Sharma | | G01D 4/002 |
| | | | | 340/870.02 |
| 2012/0239173 A1* | 9/2012 | Laikari | | A61B 5/1112 |
| | | | | 700/91 |
| 2014/0375206 A1* | 12/2014 | Holland | | H02J 9/061 |
| | | | | 315/86 |
| 2015/0057512 A1* | 2/2015 | Kapoor | | A61B 5/0205 |
| | | | | 600/324 |
| 2015/0081970 A1* | 3/2015 | Williams | | G06F 12/00 |
| | | | | 711/114 |
| 2015/0257229 A1* | 9/2015 | Wassel | | H05B 37/02 |
| | | | | 315/307 |
| 2015/0276557 A1* | 10/2015 | Masuda | | G01M 99/008 |
| | | | | 702/182 |
| 2015/0309095 A1* | 10/2015 | Monnerie | | G01R 21/133 |
| | | | | 702/60 |
| 2015/0380937 A1* | 12/2015 | Forbes, Jr. | | G05B 15/02 |
| | | | | 700/295 |
| 2016/0054374 A1* | 2/2016 | Walker | | G01R 31/025 |
| | | | | 324/750.06 |
| 2016/0072891 A1* | 3/2016 | Joshi | | G06Q 30/0269 |
| | | | | 370/254 |
| 2016/0087976 A1* | 3/2016 | Kaplan | | H04L 63/0823 |
| | | | | 713/156 |
| 2016/0163186 A1* | 6/2016 | Davidson | | G06Q 50/16 |
| | | | | 340/506 |
| 2016/0284073 A1* | 9/2016 | Michalscheck | | G06T 7/001 |
| 2016/0330225 A1* | 11/2016 | Kroyzer | | G06F 21/552 |
| 2016/0345406 A1* | 11/2016 | Donhowe | | H05B 37/0227 |
| 2016/0370819 A1* | 12/2016 | Forbes, Jr. | | G06Q 10/06 |
| 2017/0046709 A1* | 2/2017 | Lee | | G06Q 20/0655 |
| 2017/0144562 A1* | 5/2017 | Thomas | | B60L 11/1861 |
| 2017/0248383 A1* | 8/2017 | McLean, III | | F41A 17/063 |
| 2017/0250567 A1* | 8/2017 | Forbes, Jr. | | H02J 9/005 |
| 2017/0272317 A1* | 9/2017 | Singla | | H04L 41/0806 |
| 2017/0347273 A1* | 11/2017 | Goedken | | H04W 16/14 |
| 2018/0007632 A1* | 1/2018 | Chen | | H04W 52/0254 |

* cited by examiner

| Mutual correlation between sensors over unit epoch period | sensor_1 | sensor_2 | sensor_3 | sensor_4 | sensor_5 | sensor_6 | sensor_7 | sensor_8 |
|---|---|---|---|---|---|---|---|---|
| sensor_1 | | -0.15 | 0.41 | 0.75 | -0.13 | 0.28 | 0.18 | 0.20 |
| sensor_2 | -0.15 | | 0.04 | -0.23 | -0.22 | -0.30 | -0.24 | 0.37 |
| sensor_3 | 0.41 | 0.04 | | 0.66 | -0.19 | 0.13 | 0.46 | 0.31 |
| sensor_4 | 0.75 | -0.23 | 0.66 | | -0.16 | 0.43 | 0.25 | 0.28 |
| sensor_5 | -0.13 | -0.22 | -0.19 | -0.16 | | 0.17 | -0.12 | 0.12 |
| sensor_6 | 0.28 | -0.30 | 0.13 | 0.43 | 0.17 | | 0.05 | 0.05 |
| sensor_7 | 0.18 | -0.24 | 0.46 | 0.25 | -0.12 | 0.05 | | -0.04 |
| sensor_8 | 0.20 | 0.37 | 0.31 | 0.28 | 0.12 | 0.05 | -0.04 | |

| De-rating Level | Why (Examples) | De-rating Actions Performed |
|---|---|---|
| L1: *Kill* Make monitored device no functional permanently | Product shipped to export control country, battlefield, terrorism | Powergood pin disabled (product can't boot). Detection -> Communication to trigger fuse which permanently enables a circuit which makes the power good appear off. Alternatively, a part of the circuit path in the power good path is damaged by a circuit which applies a high current or voltage pulse to a narrow line causing it to open. |
| L2: *Maim* Permanently damage some function | Unpaid service contract not addressed after a certain time | Permanently disable or degrade functionality, e.g., in-field setting of a fuse or otherwise create an electromigration open on a signal path, update lookup table / nonvolatile memory to de-feature. Examples: 1) Error Code Correction (ECC) / Hamming:   a) Disable ECC altogether, or   b) reduce level of correction/     detection (e.g., go from double-     error-correct-triple-error-detect     DECTED to single-error-correct-     double-error-detect SECDED) 2) Voltage Droop Compensation:     Disable features relying on voltage     droop monitors to make the product     more susceptible to Vmin errors. 3) Disable Graphics Cores:     Allocate graphics load to non-     optimized general purpose IA cores.     Can be used in addtion to L3 actions. 4) Ground signal paths, noise injection to     I/O, clock, etc. |

FIG. 7A

| De-rating Level | Why (Examples) | De-rating Actions Performed |
|---|---|---|
| **L3: *Cripple*** Temporarily reduce functionality until a certain action performed | De-rate - Unpaid service contract | Firmware trigger which overrides power conrol unit code to lower the operational frequency to a barely functional level, e.g., MHz. Insert "no ops" into instruction stream to slow down operation at hardware level, or run functional-degrading malware at the software level. The crippling can be reversed if the triggering situation is removed. |
| **L4: *Stasis*** No Action | Nomal operation | No change: normal operation or no command or signal to change operation. |
| **L5: *Nurture*** Improve reliablity performance | Decelerate aging | Enhance the reliablity of the monitored device through core swapping to minimize reliablility impact by reducing asymmetric core usage with, e.g., reliability odometers, enhanced thermal soluctoin (e.g., more cooling or higher fan speed), adaptive clock frequency trimming, enable additoinal ECC resources dynamically (e.g., go from SECDED to DECTED). |

FIG. 7B

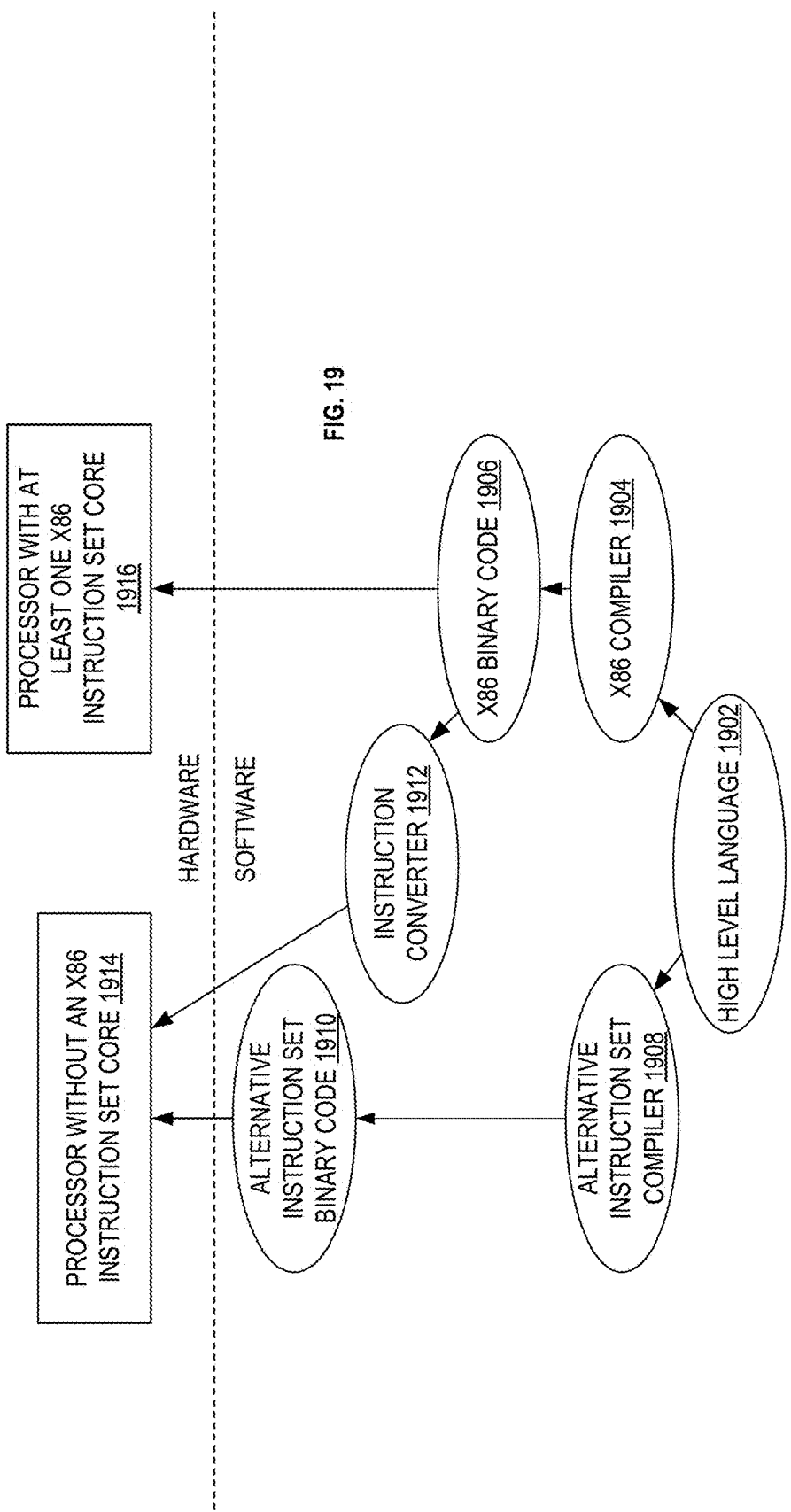

ARCHITECTURE FOR TELEMETRY AND ADAPTIVE LIFETIME CONTROL OF INTEGRATED CIRCUITS

BACKGROUND INFORMATION

When a manufacturer ships an electronic chip to a customer, the manufacturer, in a sense, "loses" control over the chip. Once out of the hands of the manufacturer, an electronic chip may be used by anyone in any manner for any purpose. However, there are many situations in the post-sales lifetime of a chip where the manufacturer would rather have the ability to terminate a function in the chip, a collection of functions, or even cripple the entire chip to the extent that the entire chip is non-functional for the user. In addition, there are also situations where the manufacturer would like to be able to enhance or enable one or more functions on a chip in order to nurture the chip in the field and thereby extending the chip's life. Currently, there is no simple way for the manufacturer to drastically affect a chip's operation after the sale without having physical access to the chip.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5 illustrates an exemplary cross-correlation matrix according to an embodiment;

FIG. 7A-7B illustrate examples of threat levels and the associated responses for each threat level;

FIG. 19 illustrates a block diagram contrasting the use of a software instruction converter to convert binary instructions in a source instruction set to binary instructions in a target instruction set according to embodiments of the invention.

DETAILED DESCRIPTION

Figure 1:
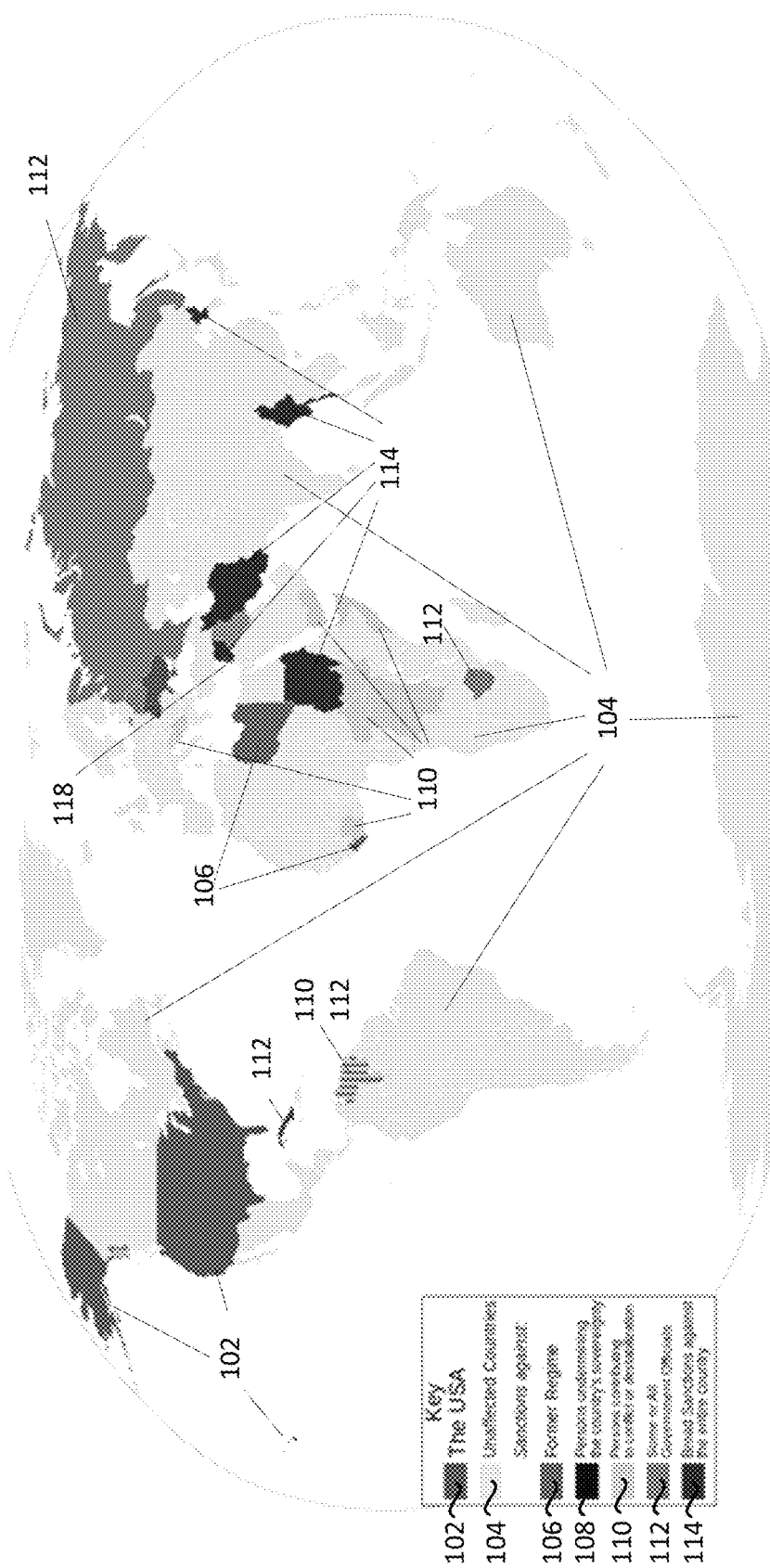
FIG. 1 is a world map illustrating US sanctions against various countries.

Apparatus, method, and system for remotely affecting the functionality and lifetime of an integrated circuit are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

There are many situations in the post-sale lifetime of an integrated circuit (IC) (e.g., chip, microchip, processor, or microprocessor) where the manufacturer desires to have the ability to terminate an IC function, a collection of functions, or even cripple the entire chip to the extent that the entire chip is non-functional for the user. For example, a chip may be used in a manner that poses a national security threat, such as when used in the unauthorized deployment or development of nuclear weapons. In such case, the manufacturer may be requested by a government or a military agency to somehow disable the chip. In another example, the manufacturer may detect or determine that a chip has being shipped to or used in a country or region in violation of the chip's export control policy. In such a scenario, the manufacture may wish to restrict the functionalities of the chip until compliance with the export control policy is restored.

On the flip side, there are also situations where the manufacturer would like to be able to enhance or enable one or more functions on the chip in order to nurture the chip in the field to extend the chip's operational lifetime. For example, a customer or licensed user may pay for additional subscription or warranty after the sale of the chip, prompting the need for the manufacturer to remotely modify the operating parameters in the chip in order to increase the chip's functionality and/or longevity. In another example, the chip may experience prolonged exposure at extreme spectrums of the operating condition resulting in accelerated degradation. When such degradation is detected or realized, the manufacturer may wish to enable or disable certain functionalities within the chip in order to slow the degradation enough for the chip to last until the warranty expires.

Currently, there is no simple way for the manufacturer to drastically affect a chip's operation post-sale without having physical access to the chip. To address this issue, one aspect of the present invention allows a chip have a comprehensive view of its own operating metrics to better gauge the level of degradation and usage. This in turn allows the chip to responsively select the most suitable methods to prolonging its operational lifetime. Another aspect of the present invention provides manufacturers with the ability to remotely control the usability of a chip, such as increasing or shortening its lifetime, by using a set of methods to positively or adversely affect the chip's operation.

In one embodiment, various levels of a chip's health and control are defined to allow for improvements (i.e., uprate) or degradations (i.e., derate) to a chip's functions. A contextual-sensing engine or an analyzer makes inferences about a chip's health and operating conditions based on various metrics associated with the chip. Then, based on these inferences, a decision is made as to whether to nurture or cripple some or all portions of the chip in the field. According to an embodiment, the decision as to whether to nurture or cripple the chip may also take into account inputs made by a remote entity. For example, an entity, such as a manufacturer, a security provider, or a government agency, that is remote from the chip may send a coded message over a network to the chip and immediately or progressively render the chip dysfunctional. In one embodiment, the remote entity may directly or indirectly monitor the health and/or usage of chip and responsively make a decision based on its observations. For example, the remote entity may receive information directly from the chip indicating the chip's physical location, such as coordinates received from a geo-locator in the chip or a list of IP addresses used by networking components connected to the chip. Alternatively, the remote entity may independently detect or determine the location of the chip, such as tracking a chip's MAC address.

Geo-locating a portable device, such as a laptop computer or cellular phone, with its global positioning system (GPS) coordinates and/or internet protocol (IP) address is well known and can be accomplished as long as the device is communicatively connected to a network such as the internet. Such locational information is useful in tracking and controlling a portable device that has either transgressed its warranty license, user agreement, and/or export control because these restrictions are often times geographically based. For example, FIG. 1 is a world map illustrating hypothetical US sanctions against various countries. In one instance, whenever a portable device is in the United States 102 or one of the unaffected regions 104, no adverse controls are imposed on the portable device. However, when the portable device enters one of the various sanctioned countries (i.e., 106-114), varying degrees of controls are imposed. In other embodiments, sanctions and export/import rules may be set or requested by governmental agency, non-governmental entities, corporations, domain names, as well as individuals. Besides tracking GPS coordinates and IP addresses, other methods for enhancing the identification and tracking of the product include product registration requirement at time of purchase, detection of radio-frequency identification (RFID) tags, observation of media access control (MAC) address, as well as the detection any other permanent or semi-permanent attributes or signals that can uniquely identify a portable device. In an embodiment, Bluetooth® communication protocol is especially suitable for tracking and identifying a portable device because in many instances, the Bluetooth module cannot be easily removed from the portable device.

Figure 2:
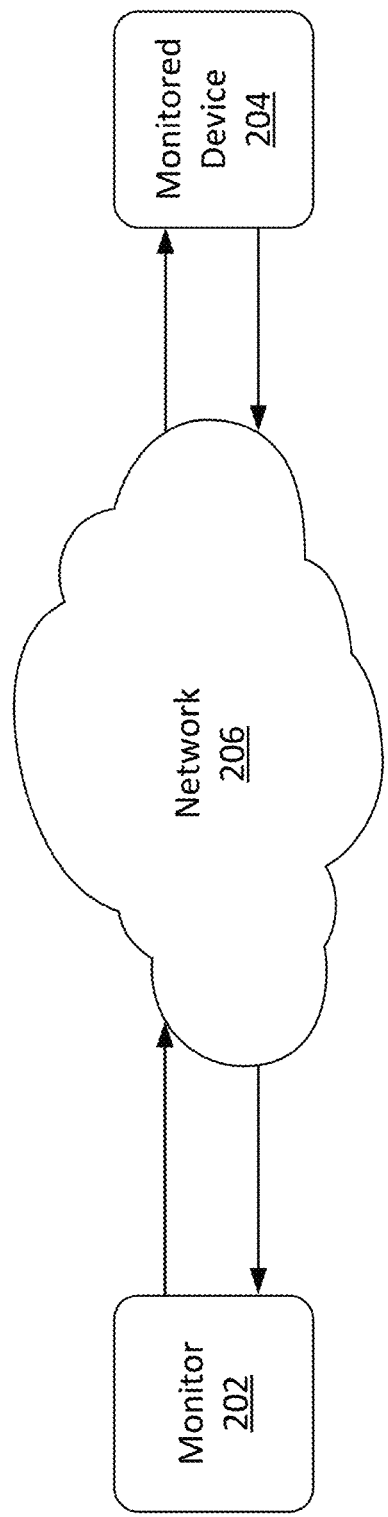
FIG. 2 is a block diagram illustrating a simplified architecture for implementing embodiments of the present invention.

FIG. 2 illustrates a simplified architecture in which aspects of the present invention may be implemented. In the FIG. 2, a monitor 202 is connected to a monitored device 204 through network 206. In one embodiment, the monitor 202 is a computer or server at a centralized remote monitoring center set up by the manufacturer for monitoring various products and devices sold by the manufacturer. In another embodiment, the remote monitoring center may be set up and/or operated by a third party such as a security provider or a government agency. The monitored device 204 may be a computer chip, IC, microchip, microprocessor, central processing unit, etc., or any device or platform in which they may be used or included. The monitored device may be manufactured and/or sold by the entity that operates or controls the monitor. In some embodiments, a monitored device is "sold" if a user has purchased, physically obtained, or acquired a license to use, the monitored device from a manufacturer or an authorized reseller. The monitor 202 and monitored device 204 is communicatively coupled through the network 206. The network may be the internet, local area network (LAN), wide area network (WAN), wireless local area network (WLAN), metropolitan area network (MAN), storage area network, system area network, server area network, small area network, Wifi, Bluetooth, etc.

Figure 3:
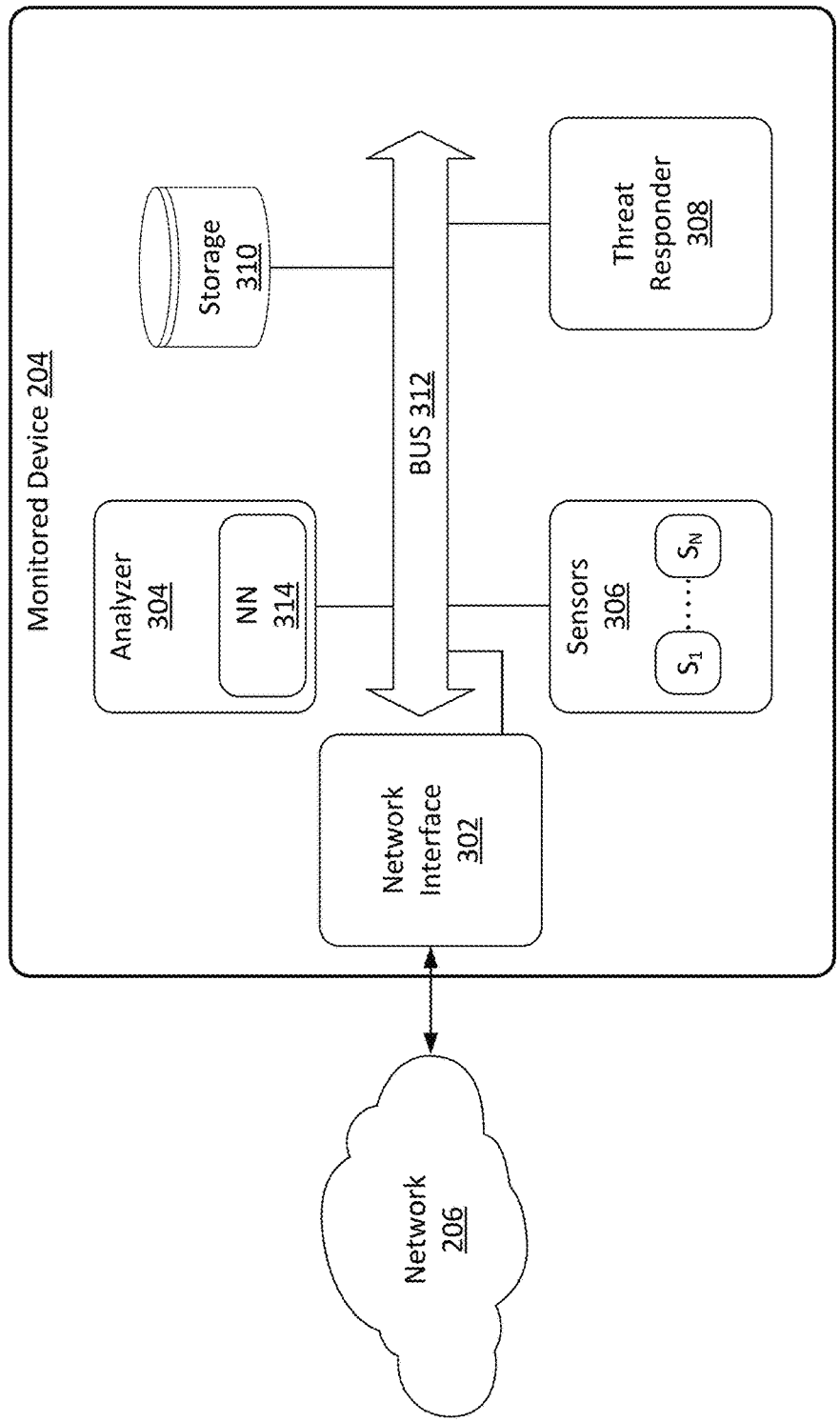
FIG. 3 is a schematic diagram illustrating an embodiment of the monitored device.

FIG. 3 is a schematic diagram illustrating an embodiment of the monitored device in more detail. The monitored device 204 includes a network interface 302, a metrics/data analyzer (analyzer) 304, one or more sensors ($S_1$-$S_N$) 306, and a threat responder 308. In an embodiment, the monitored device further includes, or is communicatively coupled to, a storage device 310. A bus 312 interconnects the different components and modules within the monitored device 204.

The network interface 302 connects the monitored device 204 to the network 206. In one embodiment, network communications to and from the monitored device 204 all go through the network interface 302. The network interface 302 may utilize one or more communications protocols such as USB, serial port, Ethernet, Wifi, Bluetooth, GPRS, any mobile communications protocol, etc., for connecting to the network. In some embodiments, the network communications from the monitored device to the remote monitor utilizes a communication protocol that is different than the protocol used by the remote monitor to communicate to the monitored device.

The sensors ($S_1$-$S_N$) 306, according to an embodiment, include reliability and performance sensors used to measure and/or track metrics related to the reliability and performance of the monitored device. In one embodiment, the sensors ($S_1$-$S_N$) 306 include sensors to detect and collect operational parameters of the monitored device, such as its physical location or the network it is on (e.g., through IP address detection). Examples of sensors ($S_1$-$S_N$) 306 include ring oscillator (FMAX), voltage droop monitor (VDM), hot-carrier-injection (HCI) detector, negative-bias-temperature-instability (NBTI) monitor (VTH, Vmin), electro-migration (EM) monitor, global positioning system (GPS), geo-locator, IP address tracker, signal detector (e.g., WiFi, Bluetooth, cellular, any untethered wireless media, etc.), watchdog timer, or any monitor or detector for providing useful data pertaining to monitored device. In a preferred embodiment, the various monitors are polling-based. The sensors ($S_1$-$S_N$) 306 may send some or all of the measured metrics/data through network interface 302 to one or more remote monitors (e.g., monitor 202 of FIG. 2) over network 206. The sensors ($S_1$-$S_N$) 306 may also send some or all of the measured metrics/data to the analyzer 304 through bus 312. In another embodiment, the metrics/data measured by sensors 306 are stored in storage 310. These stored metrics/data are later accessed by the analyzer 304 and/or sent through network interface 302 over the network 206 to one or more remote monitors (e.g., monitor 202 of FIG. 2).

According to an embodiment, in response to receiving the metrics/data from the monitored device 204, the remote monitor (e.g., monitor 202 of FIG. 2) may send one or more instructions or commands to the monitored device 204 over the network 206. The instructions and commands may intend to kill, to maim, or to cripple the monitored device based on one or more policy violations inferred or indicated by the metrics/data received from the monitored device 204. Examples of possible policy violations include: export compliance violation, warranty violation, criminal use, national security threat, license fraud, fugitive/flight from justice, etc. In one embodiment, instructions and commands may be based on a request from the government, court, or military. In an embodiment, the remote monitor (e.g., monitor 202 of FIG. 2) sends an interrupt signal containing the instruction or command to the monitored device. According to some embodiments, a signal authentication layer in the network protocol provides the security needed to ascertain only the rightful instruction or command signals are delivered from the remote monitor (e.g., monitor 202 of FIG. 2) to the monitored device 204. In some embodiments, the remote monitor may independently detect policy violation(s) relating to the monitored device without relying on any metrics/data provided by the monitored device. For example, the remote monitor may detect, based on a media access control (MAC) address associated with the monitored device being recorded in a systems log, that the monitored device is being used in a prohibited region in violation of the export compliance policy or in a criminal activity in violation of the user license agreement, without actually receiving any metrics/data from the monitored device. Any signature that can uniquely identify or track the monitored device may be used by the remote monitor to detect policy violations by the monitored device.

With respect to the analyzer 306, it may be implemented as software, hardware, firmware, or a combination of thereof. For example, according to an embodiment, the analyzer 306 is a hardware circuitry. In a preferred embodiment, the analyzer 304 includes a neural network (NN) 314, such as a Bayesian-inference unsupervised neural network. However, the analyzer 304 may also utilize other mechanisms such as machine learning mechanisms or finite state machines. According to the preferred embodiment, the neural network may be internal or external to the analyzer and/or to the monitored device. In some embodiments, the neural network 314 may provide data to the analyzer directly or over a network. In accordance to an embodiment, the analyzer 304 determines device degradations and detects policy violations based on the metrics/data collected by the sensors 306. In another embodiment, the analyzer 304 also interprets the instructions or commands communicated by the remote monitor. In some embodiments, the analyzer 304 leverages the mutual cross-correlations among various confounding reliability and performance metrics/data measured by sensors 306 to discern the larger picture of underlying degradation and/or policy violation. The analyzer 304 constructs cross-correlation matrices between every pair of measured reliability metrics/data for each epoch period over a plurality of epoch periods. The collection of cross-correlation matrices from a plurality of epoch periods, together with any commands or instructions received from the remote monitor, then serve as input to the neural network. The output of the neural network at any given epoch period is a probabilistic estimate of the threat level that the monitored device is in. In one embodiment, the calculation involved in the threat level computation may be implemented as a finite state machine either in hardware or in a level of firmware below the operating system. In other embodiments, the threat level computation is performed by a disambiguation circuitry. Based on the threat level, the threat responder 308, which may be implemented as software, hardware, firmware, or a combination of thereof, performs the appropriate response (e.g., derating action) in accordance to a predefined policy. According to an embodiment, the policy is a one-time policy set by the manufacturer at the time when the monitored device is manufactured. In other embodiments, the policy is set after manufacturing. In one embodiment, the policy is set by a purchaser (e.g., company or government) of the monitored device that is to be used by another person (e.g., employee). In another embodiment, the policy is programmed by remote monitor over the network through the network interface.

To construct the cross-correlation matrices, according to an embodiment, metrics/data collected from various reliability sensors are continuously sampled by the analyzer at an appropriate sampling period ($T_S$) over a duration known as the epoch period ($T_E$). Thus, each epoch period is an integral multiple of the sampling period $T_S$ (i.e. $T_E = n \times T_S$, where $n \geq 1$). According to the embodiment, epoch period $T_E$ is the minimum duration by which reliability metrics/data need to be collected in order to determine a change in the health or operating conditions of the monitored device.

Once sufficient metrics/data have been collected, such as after continuously collecting sensor readings or measurements in each sampling period $T_S$ over duration $T_E$, the metrics/data collected by the analyzer are normalized. According to an embodiment, the metrics/data collected are normalized relative to the minimum and maximum values collected from their respective sensors over an epoch period. For example, the minimum and maximum values collected by a particular sensor over an epoch period are set to 0.0 and 1.0 respectively. Each of the other values in the collected data set is then adjusted proportionally (i.e., normalized) to a number between the minimum (0.0) and maximum (1.0). Data normalization harmonizes data streams from various sources and epoch periods, as each data source (i.e. sensors) will have its respective minimum and maximum values for any given epoch period $T_E$. Normalization limits all sensor metrics/data collected to a value between 0.0 and 1.0.

Figure 4:
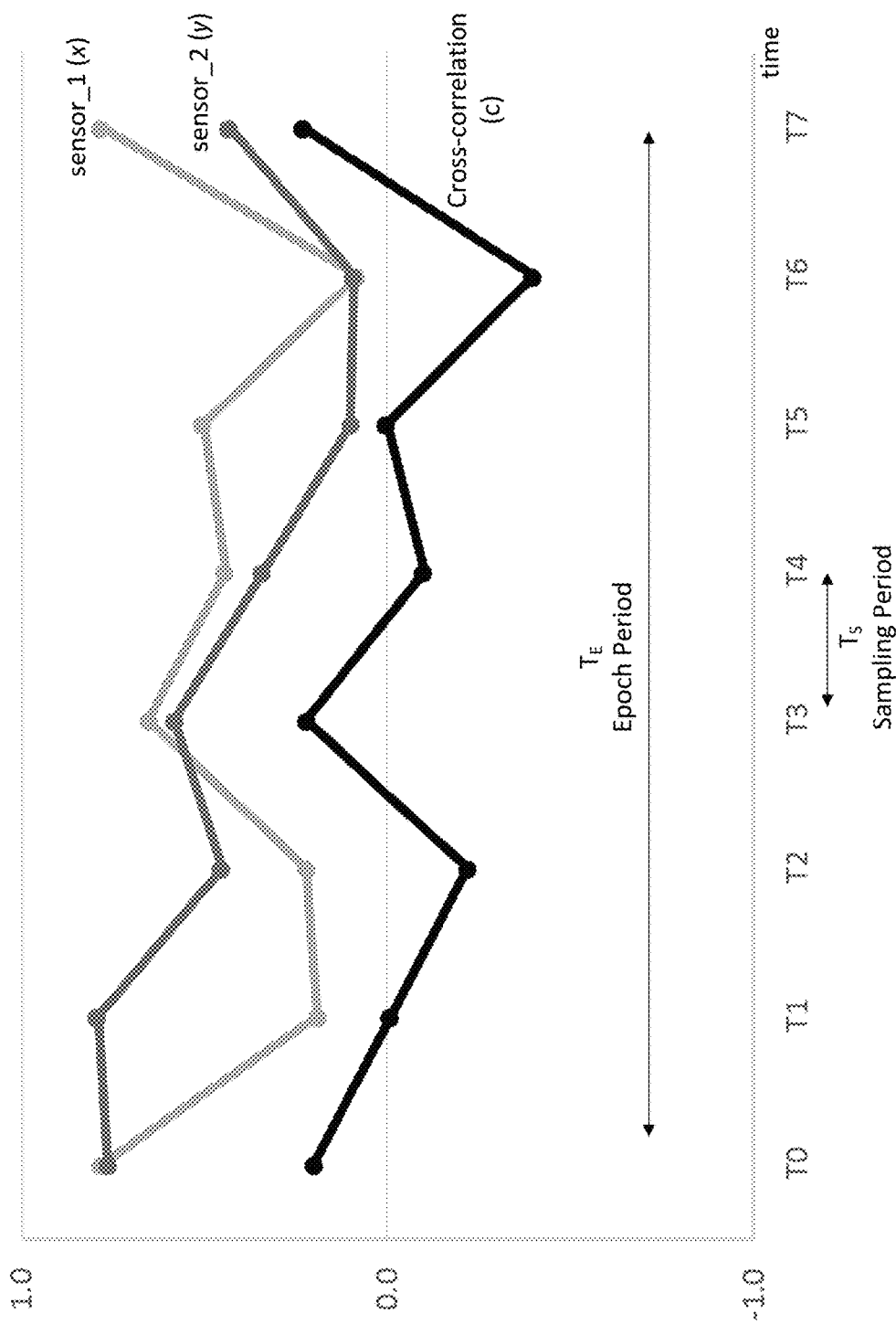
FIG. 4 is an exemplary graph illustrating the cross-correlation between pair-wise data collected from two sensors according to an embodiment.

Subsequent to data normalization, a cross-correlation on the data among each pair of sensors is computed. FIG. 4 is an exemplary graph illustrating the cross-correlation between pair-wise data collected by sensor_1 and sensor_2 over an epoch period $T_E$. Sample period $T_S$ is the time duration between two consecutive samples, and epoch period $T_E$ is the duration over which samples are collected before cross-correlation is computed. $T_S$ and $T_E$ may be any time measuring units. For example, according to the embodiment illustrated in FIG. 4, $T_S$ is 1 µs and $T_E$ is 7 µs. Epoch period $T_E$ spans over sampling periods $T_1$-$T_7$. The cross-correlation is computed between sensor_1 and sensor_2 at each sampling instant ($T_1$-$T_7$) over the epoch period.

The cross correlation between each pairs of the sensors is calculated by the following equations. Equation (1) calculates the covariance $c_{xy}$ between the frequency data collected from two sensors, denoted as x and y, for each sampling period $T_S$ over epoch period $T_E$ at lags k=0, ±1, ±2, . . . . The symbols $\bar{x}$ and $\bar{y}$ denote means of the respective data collected over the epoch period.

$$c_{xy}(k) = \begin{cases} \frac{1}{n}\sum_{t=1}^{n-k}(x_t-\bar{x})(y_{t+k}-\bar{y}), & k=0,1,2,\ldots \\ \frac{1}{n}\sum_{t=1}^{n+k}(y_t-\bar{y})(x_{t-k}-\bar{x}), & k=0,-1,-2,\ldots \end{cases} \quad (1)$$

Once the covariance is calculated, the cross-correlation $r_{xy}$ is found with equation (2):

$$r_{xy}(k) = \frac{c_{xy}(k)}{S_x S_y}, k=0,\pm 1,\pm 2,\ldots, \quad (2)$$

where standard deviations $s_x$ and $s_y$ are calculated by their respective equation (3).

$$S_x = \sqrt{c_{xx}(0)}, \text{ where } c_{xx}(0) = \text{Variance}(x) \quad (3)$$

$$S_y = \sqrt{c_{yy}(0)}, \text{ where } c_{yy}(0) = \text{Variance}(y) \quad (3)$$

The mutual cross-correlation between each pair of sensors, once computed for a given epoch period, populates the cross-correlation matrix. FIG. 5 illustrates an exemplary cross-correlation matrix 500 between each pairs of reliability sensors (sensor) from sensor_1 to sensor_8 over an epoch period. Cross-correlation matrices, such as 500, are computed and collected over multiple epoch periods. According to an embodiment, these cross-correlation matrices are then inputted into a finite state machine (FSM), a supervised learning machine, or an unsupervised learning machine to determine the relevance of each sensed parameter to the bigger context that is to be unraveled. In addition to the cross-correlation matrices, one or more instructions or commands received from the remote monitor may also be included with the input. In a preferred embodiment, a neural-network (NN) based unsupervised learning machine, such as a Bayesian-inference unsupervised neural network, is used. In the preferred embodiment, the neural network may be a five output (for threat levels L1-L5) winner-take-all network or a single k-means cluster to designate the five clusters corresponding to five threat levels L1-L5. The threat level outputted analyzer is then used to determine the appropriate response (e.g., derating action) to be taken by the threat responder 308 for each of the five threat levels L1-L5.

Figure 6:
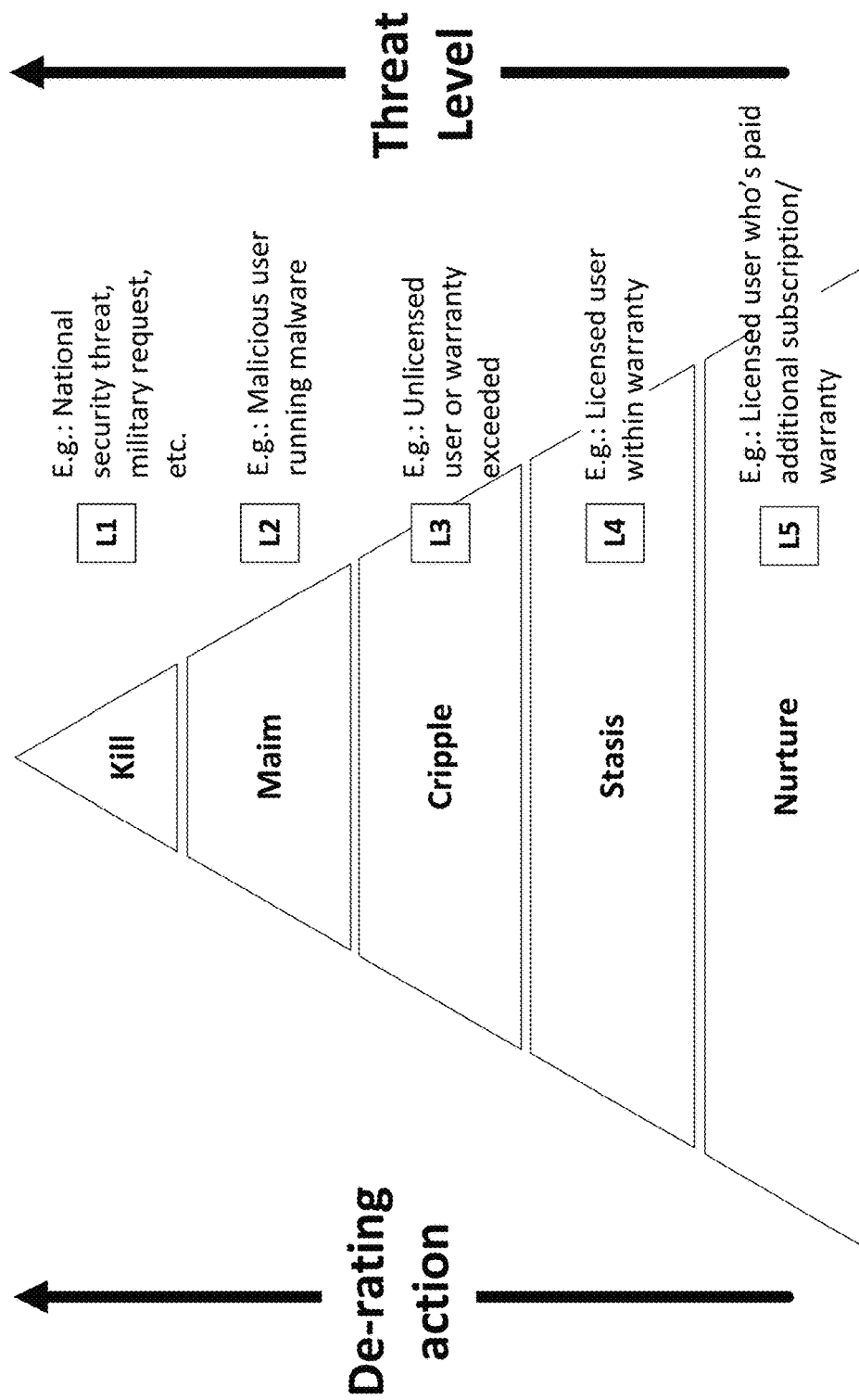
FIG. 6 illustrates progressive levels of degradation in chip function based on inferred threat level according to an embodiment.

FIG. 6 illustrates progressive levels of degradation in chip function based on inferred threat level outputted by the analyzer according to an embodiment. In the preferred embodiment, there are 5 threat levels (L1-L5) with L1 being the most severe and L5 being the least severe. Each threat level is associated with a type of derating action to be taken (e.g., Kill, Maim, Cripple, Stasis, and Nurture), as well as the type of use that may trigger the threat level classification. For example, L1 threat may be triggered or inferred when a monitored device is being used in a way that poses a threat to national security or involves a great risk to human lives and grave bodily injury. On the other spectrum, L5 threat may be triggered or inferred when a licensed user is using the monitored device in accordance to the user agreement but has now paid for additional subscription or warranty. In such case, the monitored device may need to be nurtured as to prolong its operational lifetime.

Examples of the threat levels and the responses (e.g., derating actions to be taken) associated with each level are provided in the table shown in FIGS. 7A and 7B. According to an embodiment, the threat levels and the derating actions associated with each level are configured by the manufacturer as a one-time policy during the manufacturing of the monitored device. In other embodiments, the policy containing the threat level and derating actions are configured in the monitored device after manufacturing. In one such embodiment, the policy is programmed by the purchaser of the monitored device after purchasing the device. In another embodiment, the policy is programmed by remote monitor over the network through the network interface of the chip.

Figure 8:
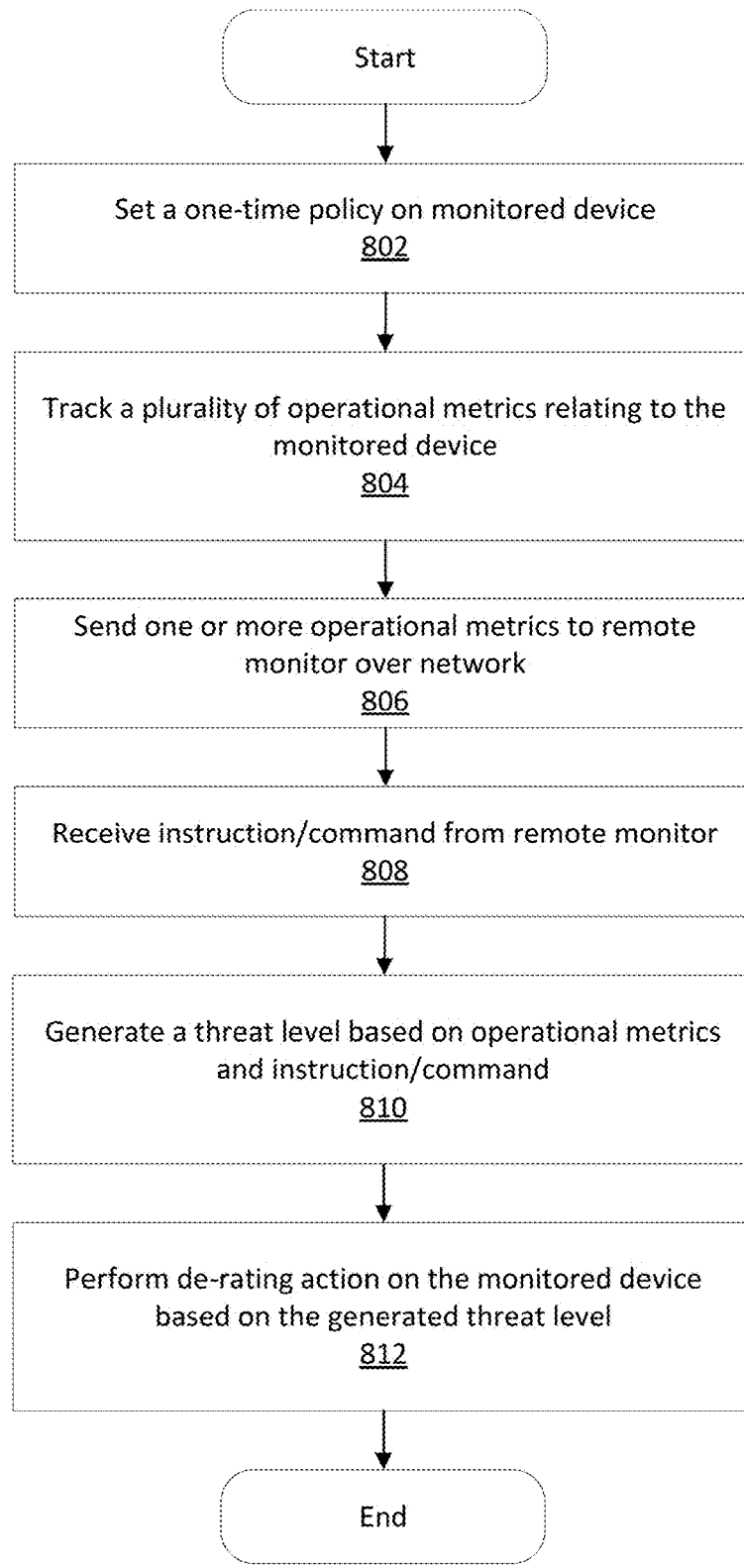
FIG. 8 is a flow diagram illustrating an embodiment of a method for determining a threat level.

FIG. 8 is a flow diagram illustrating an embodiment of a method in accordance with the present invention. According to an embodiment, the method is implemented in a monitored device (e.g., 204 of FIG. 2). At 802, a policy is set on a monitored device. According to an embodiment, the policy includes one or more threat levels and each of which is associated with at least one derating action to be performed. In one embodiment, the monitored device is a device being monitored by a remote monitor. The monitored device may be an integrated circuit, a microchip, a microprocessor, a central processing unit, a computer chip, etc., or any device or platform in which the aforementioned components may be used or included. In some embodiments, the policy is a one-time policy predefined by the manufacturer of the monitored device and set in the monitored device when it is manufactured. In other embodiments, the setting of the policy may be optional.

At 804, a plurality of metrics relating to the monitored device is tracked. In one embodiment, the tracked metrics are metrics pertaining to the operation of the monitored device. The tracked metrics may be used to infer various states about the monitored device, such as its location, operating temperature, operating environment, date of sale, rate of degradation, etc. According to an embodiment, the metrics are measured by a plurality of sensors in, or connected, to the monitored device.

At 806, one or more of the tracked metrics are sent to a remote monitor over a network. In one embodiment, the tracked metrics are sent via a network interface on the monitored device. At 808, responsive to sending the tracked metrics to the remote monitor, the monitored device receives an instruction or command from the remote monitor. In an embodiment, the received instruction or command may specify a threat level for the monitored device. At 810, a threat level is generated by the monitored device. In one embodiment, the generated threat level may be based on the metrics tracked by the monitored device, the instruction/command received from the remote monitor, or a combination of both. At 812, one or more derating actions are performed in the monitored device based on the generated threat level. The one or more derating actions may be performed a threat responder, which may be a hardware circuitry, in monitored device. According to an embodiment, derating actions associated with each threat level are based on or specified in a pre-defined policy. In an embodiment, the derating actions include enabling or disability a functionality on the monitored device.

Figure 9:
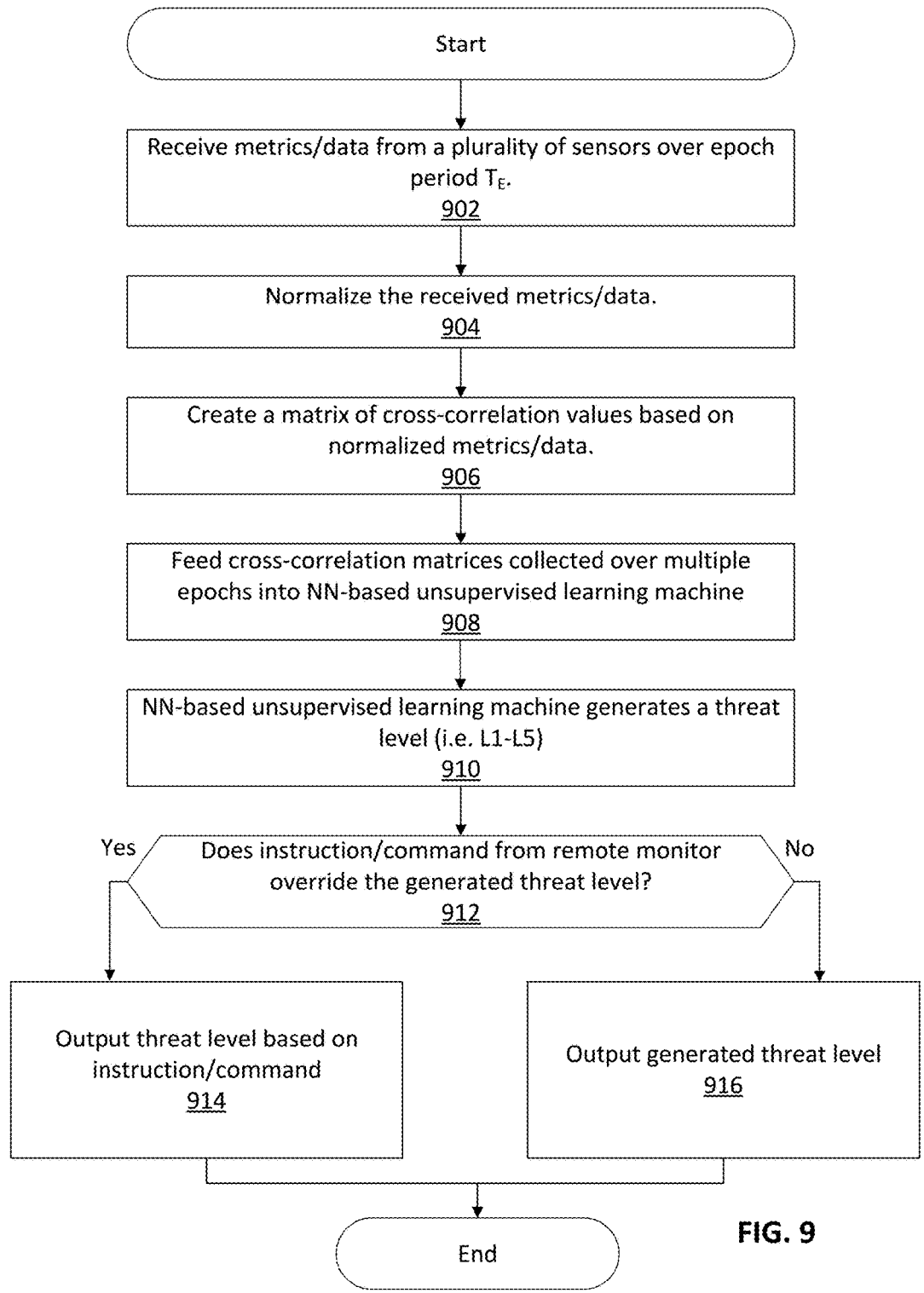
FIG. 9 is a flow diagram illustrating an embodiment of a method in accordance with the present invention.

FIG. 9 is a flow diagram illustrating an embodiment of a method for determining a threat level. In one embodiment, the method provides further detail for, or is included in, step 810 of FIG. 8. According to an embodiment, the method is implemented in the analyzer (e.g., 304 of FIG. 3). At 902, metrics/data measured at different sampling time $T_S$ over an epoch period $T_E$ are provided, respectively, by each of a plurality of sensors. Examples of the metrics/data measured by the sensors may include location, operating temperature, operating environment, date of sale, rate of degradation, etc. These metrics/data are received by the device in which the method is implemented. According to the embodiment, each epoch period $T_E$ includes multiple $T_S$.

At 904, the received metrics/data is normalized for each sensor. According to an embodiment, for each sensor, the minimum and maximum values in the received metrics/data over an epoch period is set to 0.0 and 1.0 respectively. The rest of the received metrics/data are then adjusted accordingly as numbers between 0.0 and 1.0. In at least one embodiment, the normalization of the received metrics/data is optional.

At 906, a matrix of cross-correlation values based on the normalized metrics/data for each pair of sensors is generated. In one embodiment, each row in the cross-correlation matrix corresponds to a sensor and each column of that row stores the cross-correlation value between that sensor and another sensor. According to an embodiment, the cross-correlation value is calculated based on the normalized metrics/data collected in an epoch period using the equation (2) (i.e., $r_{xy}(k)$) detailed above.

At block 908, a plurality of cross-correlation matrices collected over multiple epoch periods is fed into a neural-network based learning machine, such one implementing a Bayesian-inference unsupervised neural network. At 910, a threat level is generated by the neural-network based learning machine. In one embodiment, the threat level generated is one of five different levels, such as L1-L5.

At 912, a determination is made on whether the instructions/commands received from the remote monitor would affect the generated threat level. According to an embodiment, a threat level specified by the instruction or command from the remote monitor would always override the threat level generated by the neural-network based learning machine. In another embodiment, the two threat levels are compared and either the higher threat level or the lower threat level would be chosen. For example, a higher level threat (e.g., L1) may be chosen over a lower level threat (e.g., L5). If it is determined that the instruction/command from the remote monitor should override the generated threat level, then the threat level indicated in or based on the instruction/command would be outputted at 914. On the other hand, if it is determined that the instruction/command from the remote monitor should not override the generated threat level, then the generated threat level is outputted. According to an embodiment, outputting the threat level includes storing the threat level at a storage location or sharing the threat level with another component, process, etc.

Figure 10:
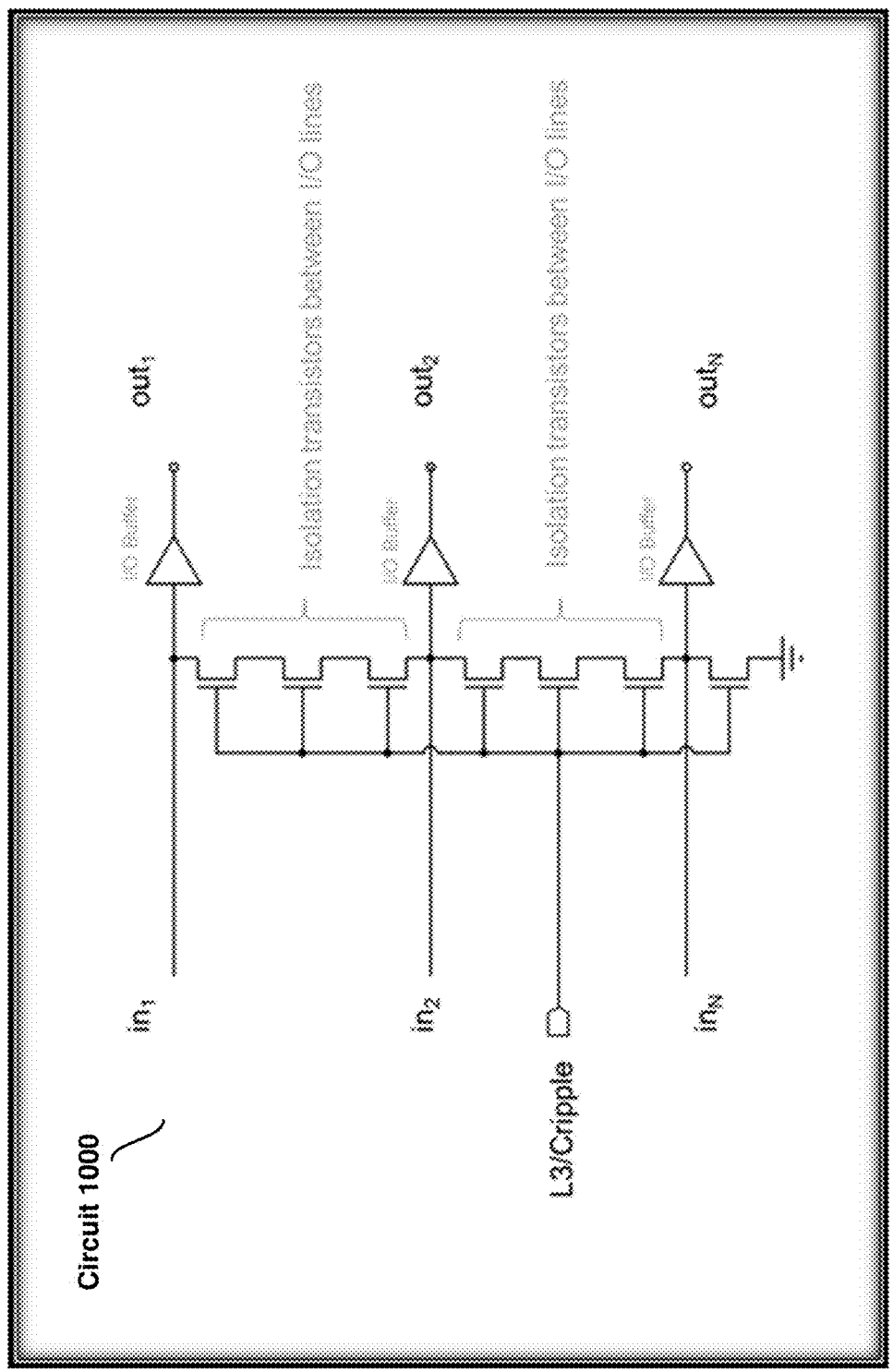
FIG. 10 is a circuit diagram illustrating a cripple circuit according to an embodiment.
Figure 11:
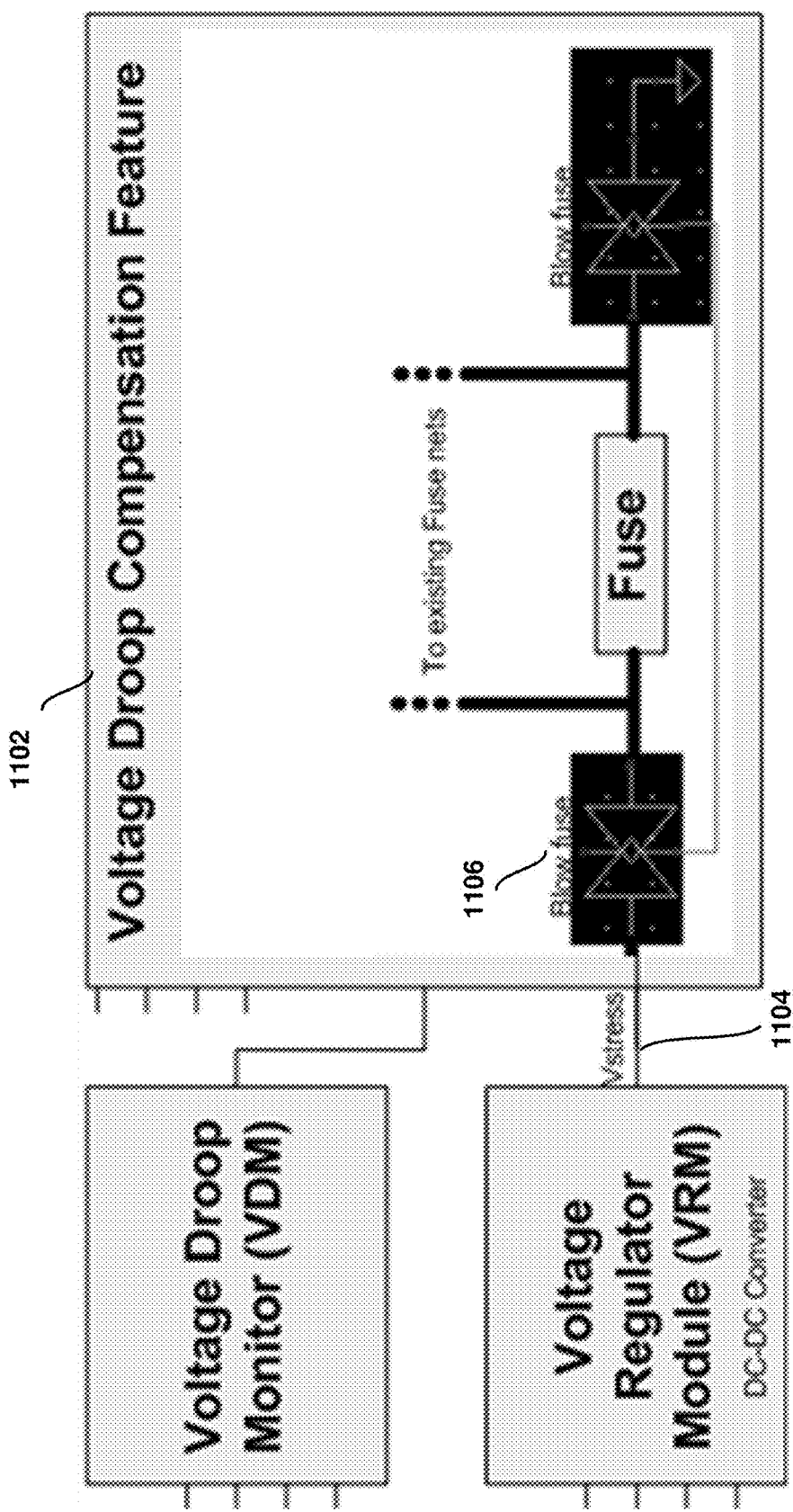
FIG. 11 is a block diagram illustrating a mechanism for blowing fuse settings in the field to disable a functionality according an embodiment.
Figure 12:
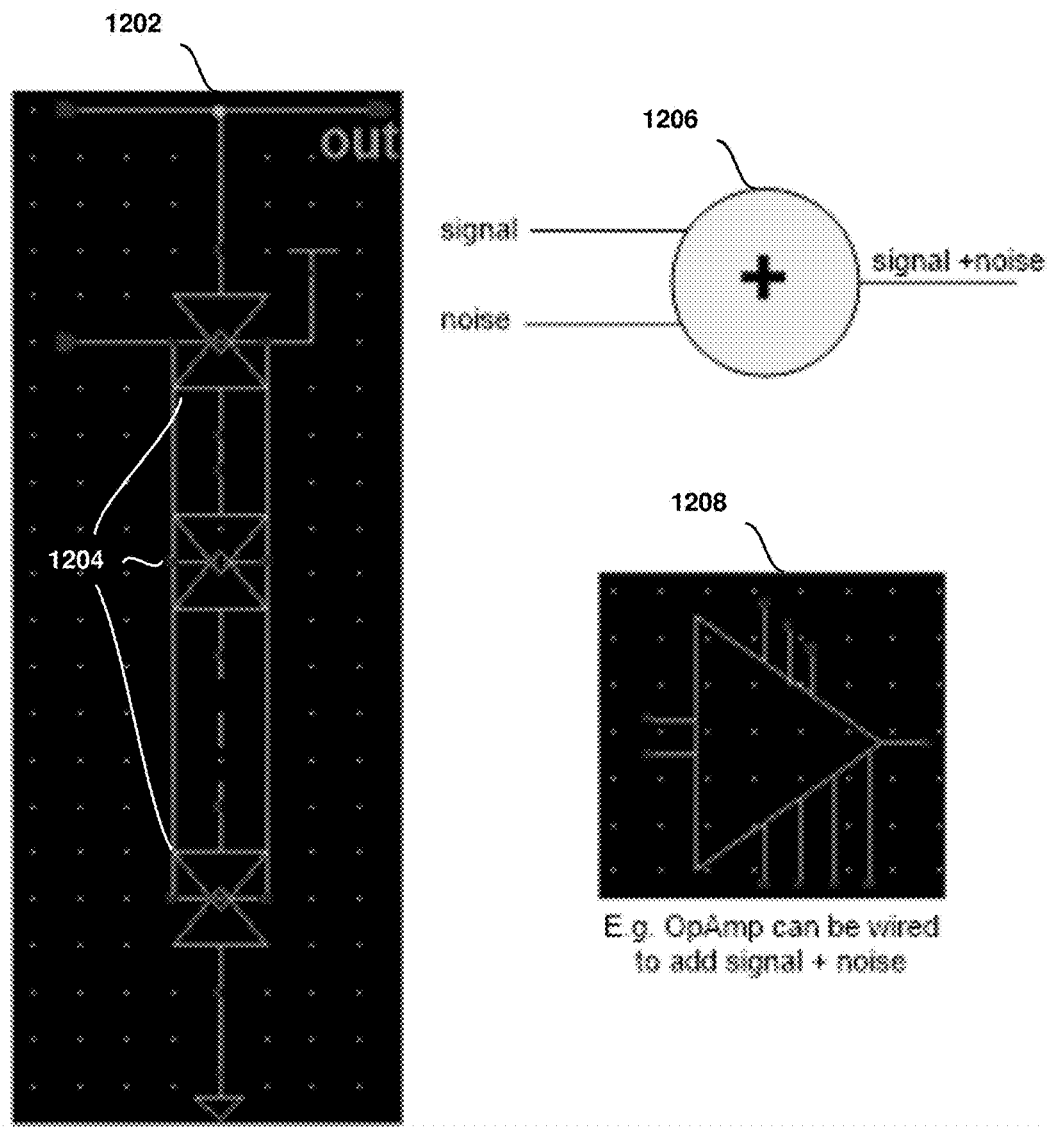
FIG. 12 illustrates various components of a mechanism for degrading signals in accordance to an embodiment.

FIGS. 10-12 illustrate a few mechanisms that may be used to perform or achieve the derating action. FIG. 10 is a circuit diagram illustrating a cripple circuit used in an embodiment. According to the embodiment, in the event of a L3 threat, the input/output lines in circuit 1000 are shorted to the ground to render a subset of the I/O functions to be performed by the circuit dysfunctional. FIG. 11 is a block diagram illustrating a mechanism for blowing fuse settings in the field to disable a functionality. According to an embodiment, excess voltage (Vstress) 1104 is applied to blow fuse 1106 which in turn disables the Voltage Droop Compensation Feature 1102. FIG. 12 illustrates various components of a mechanism for degrading signals. The mechanism uses pass gates 1204 to pull signals (e.g., digital I/O, clock, etc.) to the ground. The gates are stacked to reduce leakage under nominal operation. An adder 1206 may be used to add noise to the signal. For example, operational amplifier (Op Amp) 1208 may be wired into the circuit 1202 to introduce noise.

On embodiment of the present invention is an apparatus including a plurality of sensors to track a plurality of operational metrics on the apparatus, an analyzer circuitry to generate a threat level based at least in part on the plurality of operational metrics, and a threat responder circuitry to perform a derating action based on the threat level. In one embodiment, the apparatus further includes a network interface to send one or more of the plurality of operational metrics to a remote monitor and/or to receive a command form the remote monitor.

In one embodiment, the command from the remote monitor is generated by the remote monitor based, at least in part, on the one or more of the plurality of operational metrics. In another embodiment, the command from the remote monitor is generated based on information obtained independently by the remote monitor and not based on the one or more of the plurality of operational metrics. In one embodiment, the analyzer circuitry of the apparatus generates the threat level by: receiving the plurality of operational metrics from the plurality of sensors over an epoch period; normalizing the plurality of operational metrics to create normalized operational metrics; creating a matrix of cross-correlation values based on the normalized operational metrics; feeding a plurality of cross-correlation matrices collected over a plurality of epochs into a neural network, the neural network to generated a threat level based on the plurality of cross-correlation matrices; and outputting the generated threat level if the generated threat level is not overridden by the command from the remote monitor and outputting a second threat level indicated by the command from the remote monitor when the generated threat level is overridden by the command from the remote monitor. In one embodiment, the derating action to be performed by the threat responder circuitry respective to each threat level is specified by a policy set by a manufacturer of the apparatus. The derating action to be performed by the threat responder circuitry includes enabling or disabling a functionality on the apparatus, or alternatively, includes maintaining existing functionalities in the apparatus. In one embodiment, the threat level outputted by the analyzer circuitry is one of kill, maim, cripple, stasis, or nurture. In at least some embodiments, the analyzer circuitry of the apparatus includes a neural network. In some embodiments, the plurality of sensors includes geo-locator, temperature sensor, voltage droop monitor, and/or IP address detector. The plurality of operational metrics tracked by the plurality of sensors may include geographic coordinates of the apparatus, operational temperature of the apparatus, voltage consumed by the apparatus, and/or IP addresses used by the apparatus. In one embodiment, the threat responder circuitry of the apparatus performs the derating action by using a cripple circuit, a blow fuse, or a degrading signal.

Another embodiment of the present invention is a system including a monitored device connected to a remote monitor through a network. The monitored device is to track a plurality of operational metrics on the monitored device, to generate via an analyzer circuitry within the monitored device, a threat level based at least in part on the plurality of operational metrics, and to perform a derating action based on the threat level. In an embodiment, the monitored device is to send one or more of the plurality of operational metrics to the remote monitor and/or to receive a command from the remote monitor. In some embodiments, the command from the remote monitor is generated by the remote monitor based, at least in part, on the one or more of the plurality of operational metrics. Alternatively, the command from the remote monitor is generated based on information obtained independently by the remote monitor and not based on the one or more of the plurality of operational metrics. In one embodiment, the analyzer generates the threat level by: receiving the plurality of operational metrics from a plurality of sensors over an epoch period; normalizing the plurality of operational metrics to create normalized operational metrics; creating a matrix of cross-correlation values based on the normalized operational metrics; feeding a plurality of cross-correlation matrices collected over a plurality of epochs into a neural network, the neural network to generated a threat level based on the plurality of cross-correlation matrices; and outputting the generated threat level if the generated threat level is not overridden by the command from the remote monitor and outputting a second threat level indicated by the command from the remote monitor when the generated threat level is overridden by the command from the remote monitor. According to an embodiment, the derating action to be performed by the monitored device respective to each threat level is specified by a policy set by a manufacturer of the monitored device. The derating action to be performed by the monitored device includes enabling or disabling a functionality on the monitored device, or alternatively, includes maintaining existing functionalities on the monitored device. In at least one embodiment, the threat level generated by monitored device is one of kill, maim, cripple, stasis, or nurture. In some embodiments, the monitored device further includes geo-locator, temperature sensor, voltage droop monitor, and/or IP address detector to track operational metrics including geographic coordinates of the monitored device, operational temperature of the monitored device, voltage consumed by the monitored device, and/or IP addresses used by the monitored device. According to an embodiment, the monitored device performs the derating action by using a cripple circuit, a blow fuse, or a degrading signal. In at least some embodiments, the analyzer circuitry includes a neural network.

An embodiment of the present invention is a method implemented in a monitored device, the method includes tracking a plurality of operational metrics relating to the monitored device, sending one or more of the plurality of operational metrics to a remote monitor and responsively receiving a command generated by the remote monitor, generating a threat level based on the plurality of operational metrics and the command, and performing a derating action based on the threat level. In one embodiment, the command from the remote monitor is generated by the remote monitor based, at least in part, on the one or more of the plurality of operational metrics. Alternatively, the command from the remote monitor is generated based on information obtained independently by the remote monitor and not based on the one or more of the plurality of operational metrics. In one embodiment, the derating action to be performed respective to each threat level is specified by a pre-defined policy. In some embodiments, performing the derating action includes enabling or disabling a functionality of the monitored device, or alternatively, the derating action includes maintaining existing functionalities on the monitored device. In one embodiment, the threat level generated includes one of kill, maim, cripple, stasis, or nurture. According to some embodiments, tracking the plurality of operational metrics relating to the monitored device may include determining geographic coordinates of the monitored device, measuring operational temperature of the monitored device, measuring voltage consumed by the monitored device, and/or tracking IP addresses used by the monitored device. In one embodiment, performing the derating action comprises crippling a circuit, blowing a fuse, and/or degrading a signal. In one embodiment, generating the threat level based on the plurality of operational metrics includes: receiving the plurality of operational metrics from a plurality of sensors over an epoch period; normalizing the plurality of operational metrics to create normalized operational metrics; creating a matrix of cross-correlation values based on the normalized operational metrics; feeding a plurality of cross-correlation matrices collected over a plurality of epochs into a neural network, the neural network to generated a threat level based on the plurality of cross-correlation matrices; and outputting the generated threat level if the generated threat level is not overridden by a command from the remote monitor and outputting a second threat level indicated by the command from the remote monitor when the generated threat level is overridden by the command from the remote monitor.

Another embodiment of the present invention is a non-transitory machine readable medium having program code stored thereon which, when executed by a machine, causes the machine to perform operations of: tracking a plurality of operational metrics relating to a monitored device; sending one or more of the plurality of operational metrics to a remote monitor and responsively receiving a command generated by the remote monitor; generating a threat level based on the plurality of operational metrics and the command; and performing a derating action based on the threat level. In one embodiment, the command from the remote monitor is generated by the remote monitor based, at least in part, on the one or more of the plurality of operational metrics. Alternatively, the command from the remote monitor is generated based on information obtained independently by the remote monitor and not based on the one or more of the plurality of operational metrics. In one embodiment, the derating action to be performed respective to each threat level is specified by a pre-defined policy. In some embodiments, performing the derating action includes enabling or disabling a functionality of the monitored device, or alternatively, includes maintaining existing functionalities on the monitored device. In one embodiment, the threat level generated comprises one of kill, maim, cripple, stasis, or nurture. According to an embodiment, tracking the plurality of operational metrics relating to the monitored device may include determining geographic coordinates of the monitored device; measuring operational temperature of the monitored device; measuring voltage consumed by the monitored device; and/or tracking IP addresses used by the monitored device. In one embodiment, performing the derating action may include crippling a circuit, blowing a fuse, and/or degrading a signal. According to an embodiment, generating the threat level based on the plurality of operational metrics includes: receiving the plurality of operational metrics from a plurality of sensors over an epoch period; normalizing the plurality of operational metrics to create normalized operational metrics; creating a matrix of cross-correlation values based on the normalized operational metrics; feeding a plurality of cross-correlation matrices collected over a plurality of epochs into a neural network, the neural network to generated a threat level based on the plurality of cross-correlation matrices; and outputting the generated threat level if the generated threat level is not overridden by a command from the remote monitor and outputting a second threat level indicated by the command from the remote monitor when the generated threat level is overridden by the command from the remote monitor.

Another embodiment of the present invention is an apparatus including means for tracking a plurality of operational metrics relating to a monitored device, means for sending one or more of the plurality of operational metrics to a remote monitor and responsively receiving a command generated by the remote monitor, means for generating a threat level based on the plurality of operational metrics and the command, and means for performing a derating action based on the threat level.

Figure 13:
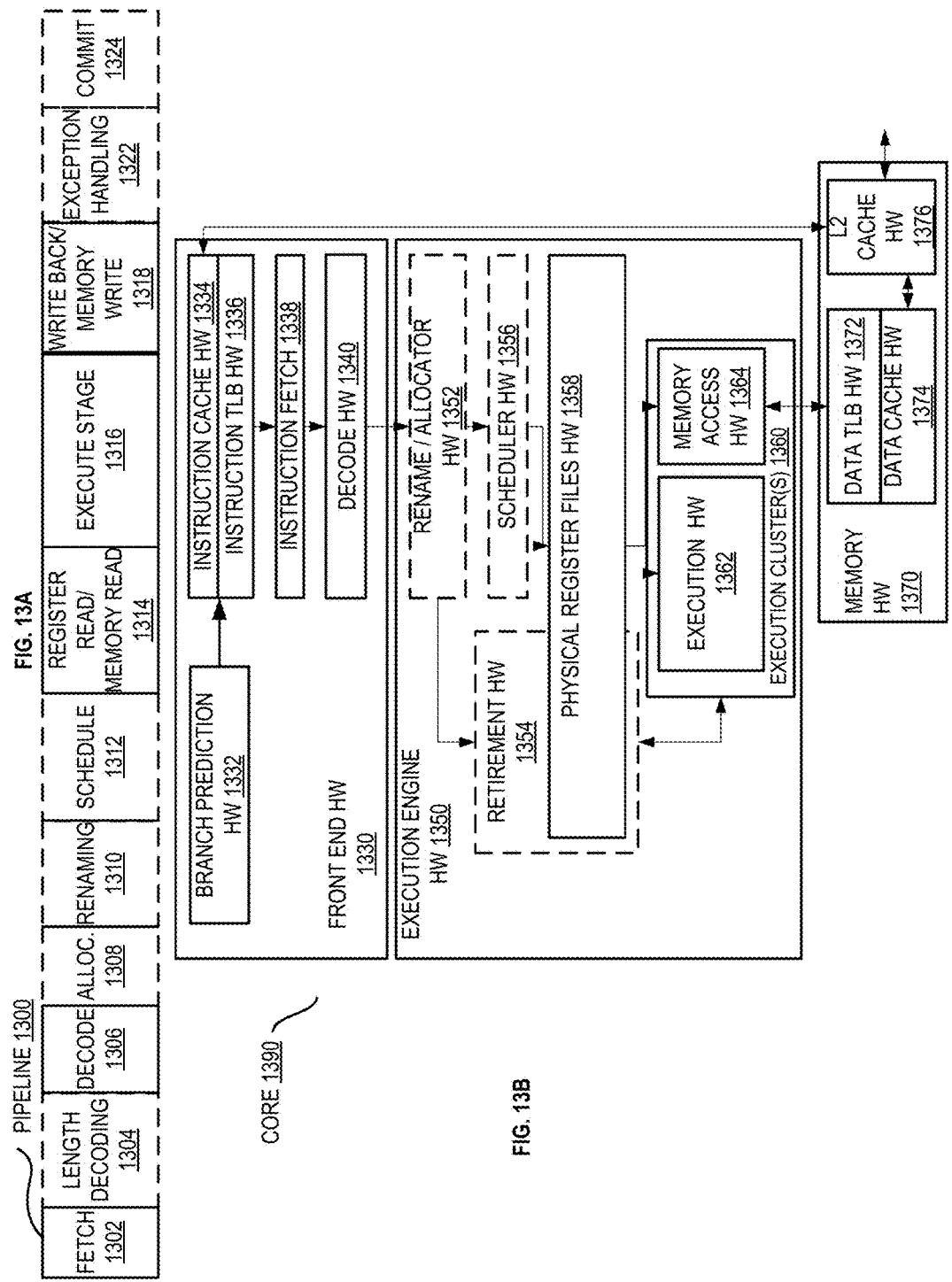
FIG. 13A is a block diagram illustrating both an exemplary in-order pipeline and an exemplary register renaming, out-of-order issue/execution pipeline according to embodiments of the invention.
FIG. 13B is a block diagram illustrating both an exemplary embodiment of an in-order architecture core and an exemplary register renaming, out-of-order issue/execution architecture core to be included in a processor according to embodiments of the invention.

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end hardware 1330 coupled to an execution engine hardware 1350, and both are coupled to a memory hardware 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end hardware 1330 includes a branch prediction hardware 1332 coupled to an instruction cache hardware 1334, which is coupled to an instruction translation lookaside buffer (TLB) 1336, which is coupled to an instruction fetch hardware 1338, which is coupled to a decode hardware 1340. The decode hardware 1340 (or decoder) may decode instructions, and generate as an output one or more microoperations, micro-code entry points, microinstructions, other instructions, or other control signals, which are decoded from, or which otherwise reflect, or are derived from, the original instructions. The decode hardware 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode hardware 1340 or otherwise within the front end hardware 1330). The decode hardware 1340 is coupled to a rename/allocator hardware 1352 in the execution engine hardware 1350.

The execution engine hardware 1350 includes the rename/allocator hardware 1352 coupled to a retirement hardware 1354 and a set of one or more scheduler hardware 1356. The scheduler hardware 1356 represents any number of different schedulers, including reservations stations, central instruction window, etc. The scheduler hardware 1356 is coupled to the physical register file(s) hardware 1358. Each of the physical register file(s) hardware 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) hardware 1358 comprises a vector registers hardware, a write mask registers hardware, and a scalar registers hardware. These register hardware may provide architectural vector registers, vector mask registers, and general purpose registers. The physical register file(s) hardware 1358 is overlapped by the retirement hardware 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement hardware 1354 and the physical register file(s) hardware 1358 are coupled to the execution cluster(s) 1360. The execution cluster(s) 1360 includes a set of one or more execution hardware 1362 and a set of one or more memory access hardware 1364. The execution hardware 1362 may perform various operations (e.g., shifts, addition, subtraction, multiplication) and on various types of data (e.g., scalar floating point, packed integer, packed floating point, vector integer, vector floating point). While some embodiments may include a number of execution hardware dedicated to specific functions or sets of functions, other embodiments may include only one execution hardware or multiple execution hardware that all perform all functions. The scheduler hardware 1356, physical register file(s) hardware 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler hardware, physical register file(s) hardware, and/or execution cluster—and in the case of a separate memory access pipeline, certain embodiments are implemented in which only the execution cluster of this pipeline has the memory access hardware 1364). It should also be understood that where separate pipelines are used, one or more of these pipelines may be out-of-order issue/execution and the rest in-order.

The set of memory access hardware 1364 is coupled to the memory hardware 1370, which includes a data TLB hardware 1372 coupled to a data cache hardware 1374 coupled to a level 2 (L2) cache hardware 1376. In one exemplary embodiment, the memory access hardware 1364 may include a load hardware, a store address hardware, and a store data hardware, each of which is coupled to the data TLB hardware 1372 in the memory hardware 1370. The instruction cache hardware 1334 is further coupled to a level 2 (L2) cache hardware 1376 in the memory hardware 1370.

The L2 cache hardware 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode hardware 1340 performs the decode stage 1306; 3) the rename/allocator hardware 1352 performs the allocation stage 1308 and renaming stage 1310; 4) the scheduler hardware 1356 performs the schedule stage 1312; 5) the physical register file(s) hardware 1358 and the memory hardware 1370 perform the register read/memory read stage 1314; the execution cluster 1360 perform the execute stage 1316; 6) the memory hardware 1370 and the physical register file(s) hardware 1358 perform the write back/memory write stage 1318; 7) various hardware may be involved in the exception handling stage 1322; and 8) the retirement hardware 1354 and the physical register file(s) hardware 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache hardware 1334/1374 and a shared L2 cache hardware 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14:
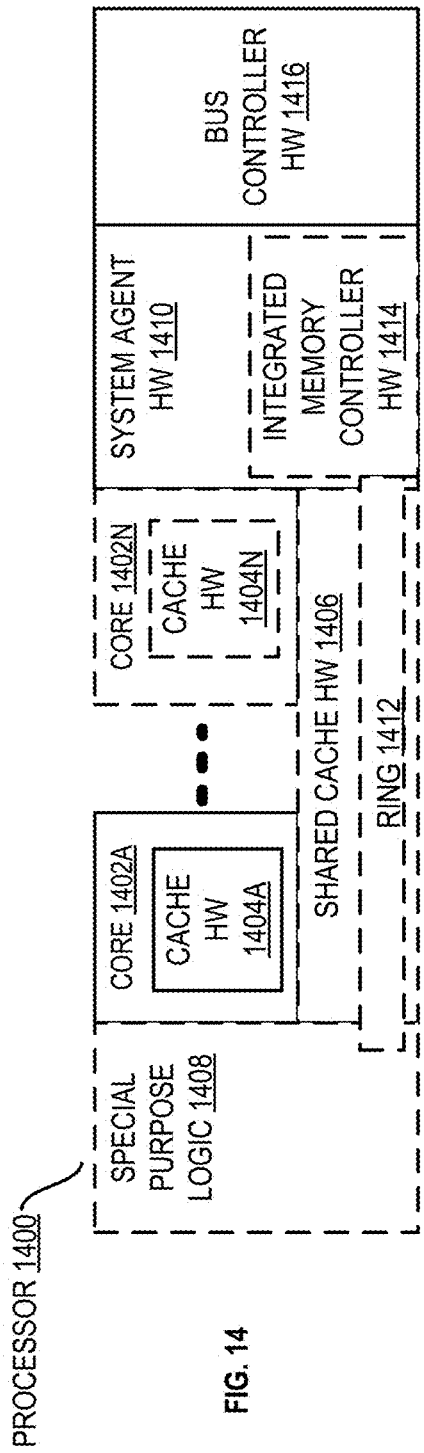
FIG. 14 is a block diagram of a single core processor and a multicore processor with integrated memory controller and graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller hardware 1416, while the optional addition of the dashed lined boxes illustrates an alternative processor 1400 with multiple cores 1402A-N, a set of one or more integrated memory controller hardware 1414 in the system agent hardware 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache hardware 1406, and external memory (not shown) coupled to the set of integrated memory controller hardware 1414. The set of shared cache hardware 1406 may include one or more mid-level caches, such as level 2 (L2), level 3 (L3), level 4 (L4), or other levels of cache, a last level cache (LLC), and/or combinations thereof. While in one embodiment a ring based interconnect hardware 1412 interconnects the integrated graphics logic 1408, the set of shared cache hardware 1406, and the system agent hardware 1410/integrated memory controller hardware 1414, alternative embodiments may use any number of well-known techniques for interconnecting such hardware. In one embodiment, coherency is maintained between one or more cache hardware 1406 and cores 1402-A-N.

In some embodiments, one or more of the cores 1402A-N are capable of multi-threading. The system agent 1410 includes those components coordinating and operating cores 1402A-N. The system agent hardware 1410 may include for example a power control unit (PCU) and a display hardware. The PCU may be or include logic and components needed for regulating the power state of the cores 1402A-N and the integrated graphics logic 1408. The display hardware is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set. In one embodiment, the cores 1402A-N are heterogeneous and include both the "small" cores and "big" cores described below.

FIGS. 15-18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
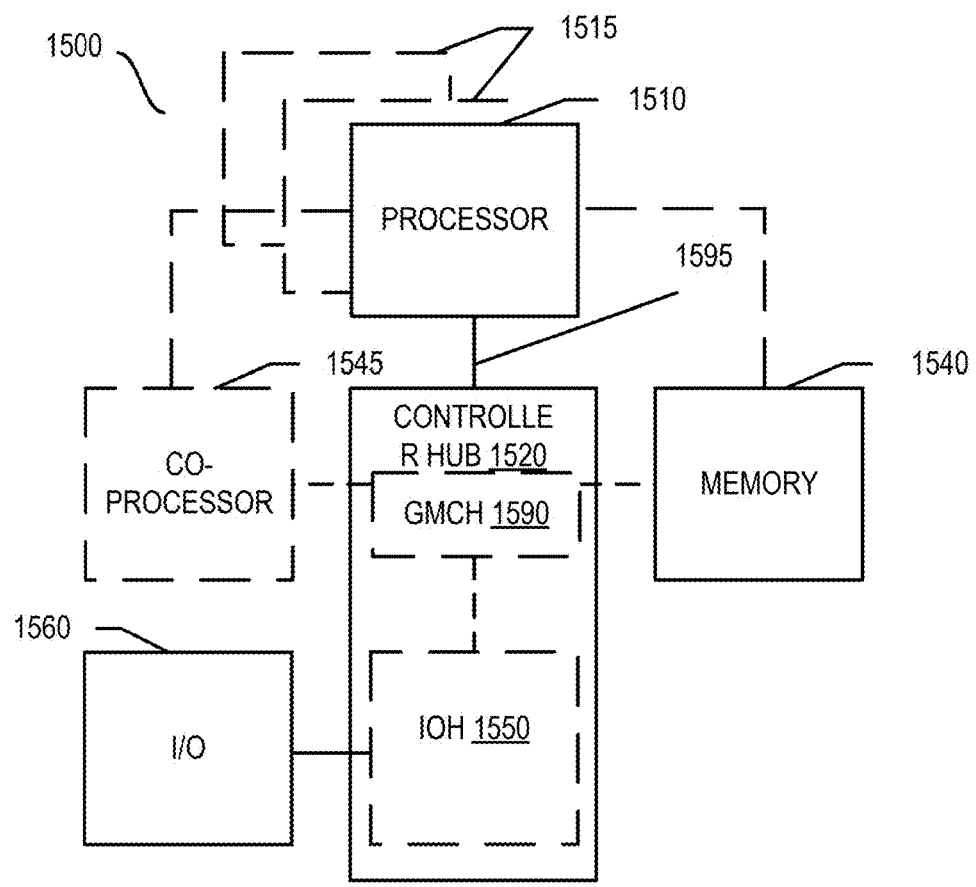
FIG. 15 illustrates a block diagram of a system in accordance with one embodiment of the present invention.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 is couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface, or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the physical resources 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor (s) 1545 accept and execute the received coprocessor instructions.

Figure 16:
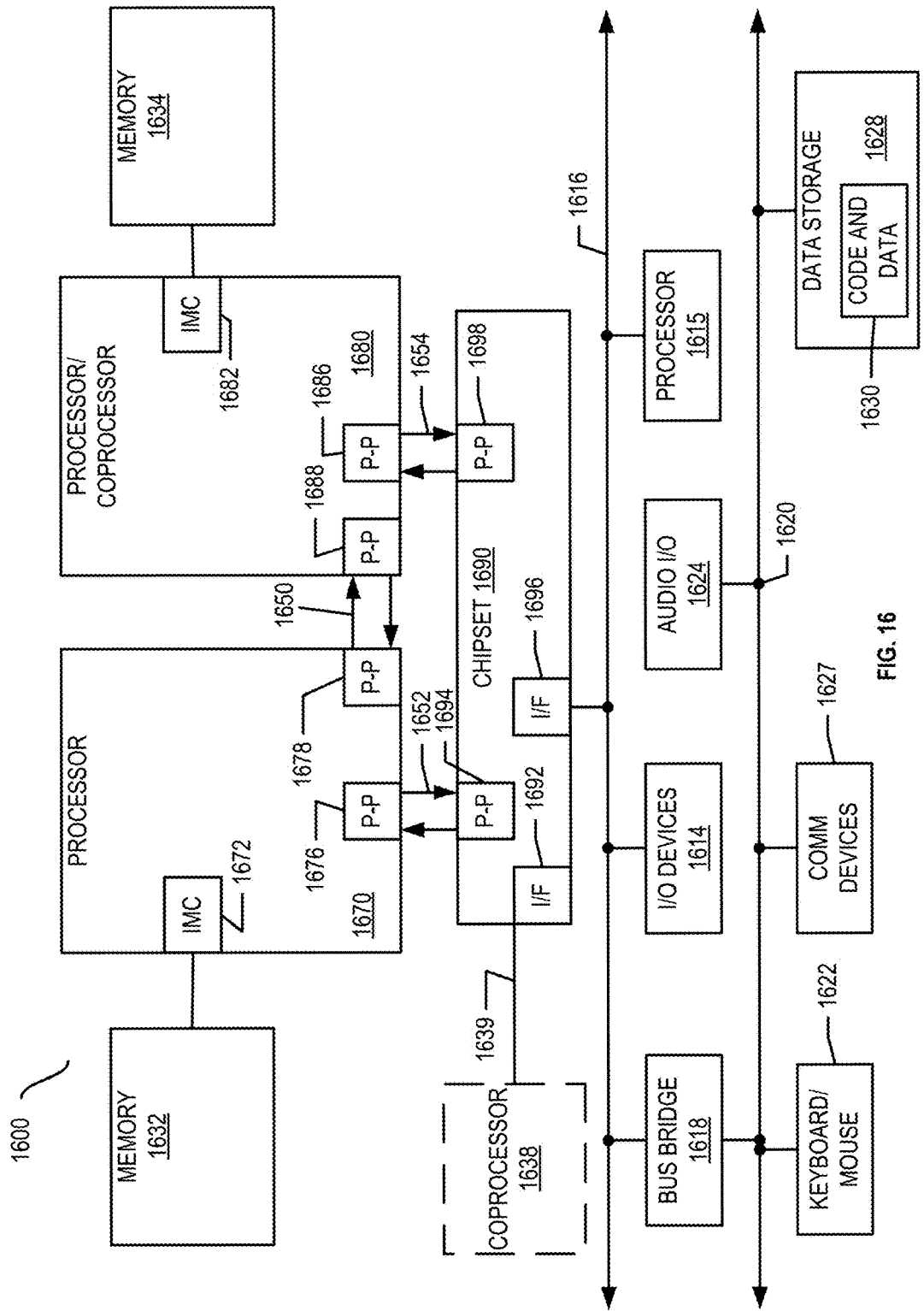
FIG. 16 illustrates a block diagram of a second system in accordance with an embodiment of the present invention.

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) hardware 1672 and 1682, respectively. Processor 1670 also includes as part of its bus controller hardware point-to-point (P-P) interfaces 1676 and 1678; similarly, second processor 1680 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) hardware), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage hardware 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
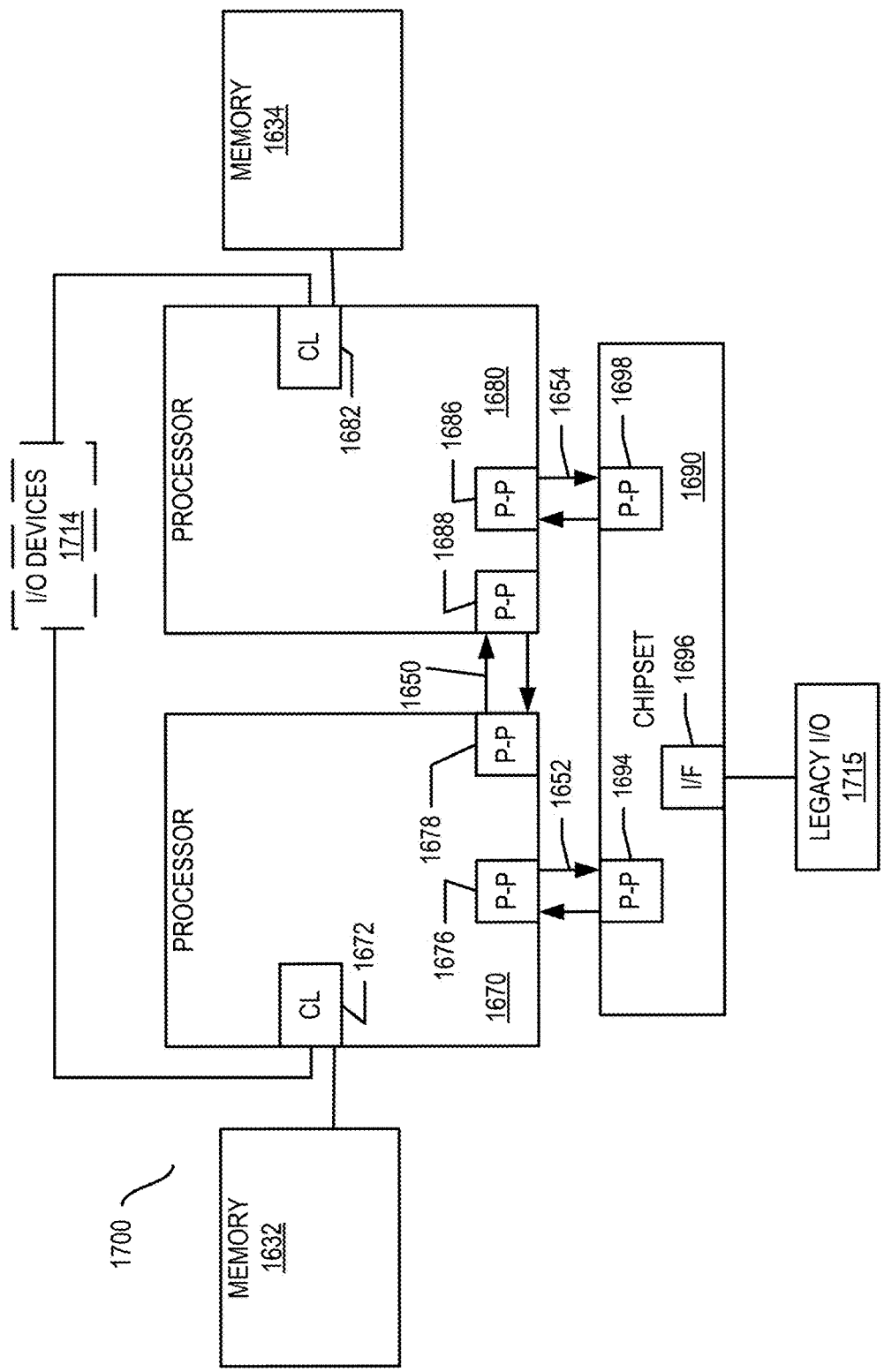
FIG. 17 illustrates a block diagram of a third system in accordance with an embodiment of the present invention.

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1672 and 1682, respectively. Thus, the CL 1672, 1682 include integrated memory controller hardware and include I/O control logic. FIG. 17 illustrates that not only are the memories 1632, 1634 coupled to the CL 1672, 1682, but also that I/O devices 1714 are also coupled to the control logic 1672, 1682. Legacy I/O devices 1715 are coupled to the chipset 1690.

Figure 18:
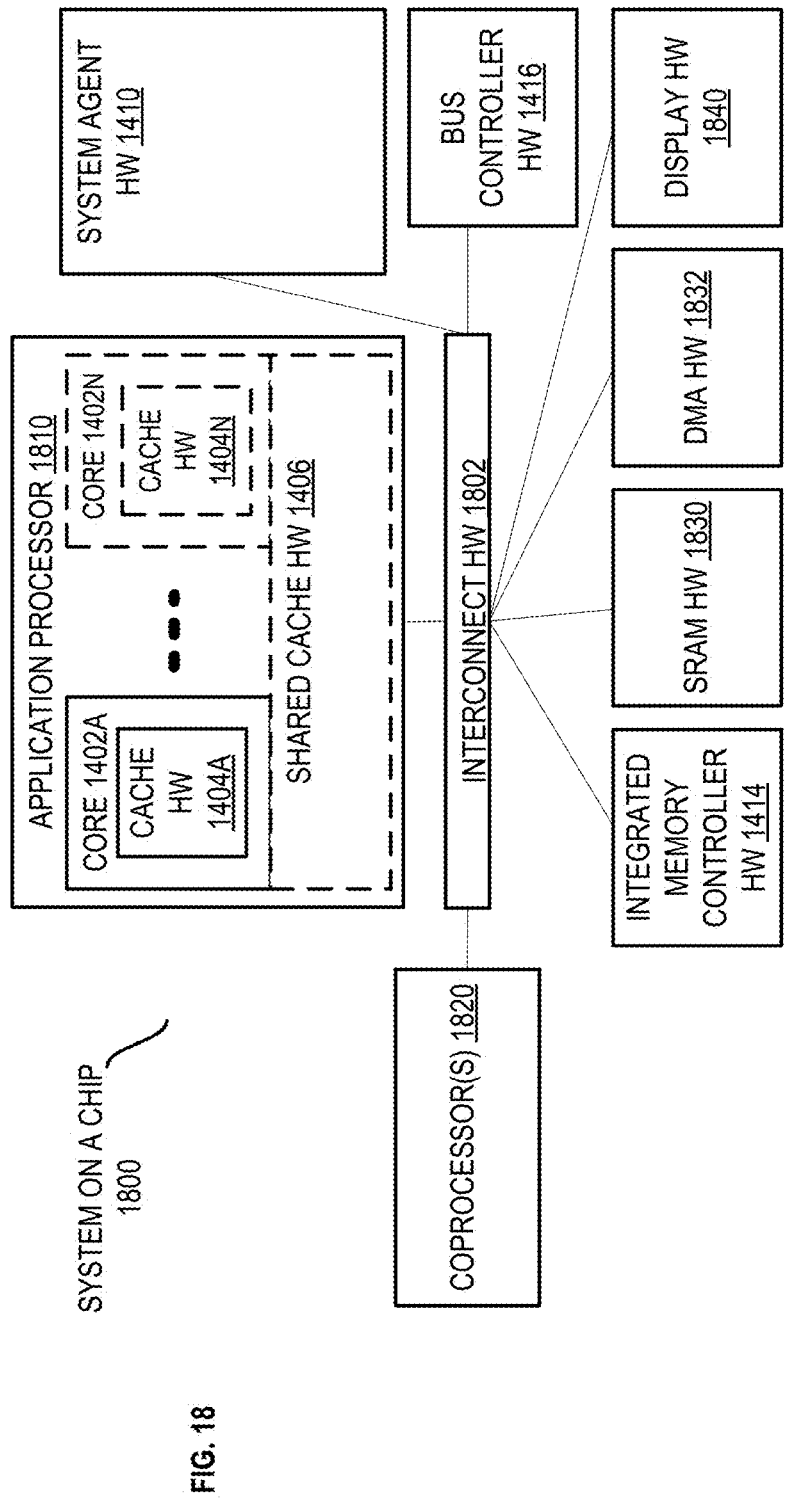
FIG. 18 illustrates a block diagram of a system on a chip (SoC) in accordance with an embodiment of the present invention.

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect hardware 1802 is coupled to: an application processor 1810 which includes a set of one or more cores 1402A-N and shared cache hardware 1406; a system agent hardware 1410; a bus controller hardware 1416; an integrated memory controller hardware 1414; a set or one or more coprocessors 1820 which may include integrated graphics logic, an image processor, an audio processor, and a video processor; an static random access memory (SRAM) hardware 1830; a direct memory access (DMA) hardware 1832; and a display hardware 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An apparatus that is a computer processor, the apparatus comprising:
    one or more processor cores;
    a plurality of sensors to track a plurality of operational metrics on the apparatus;
    a network interface to send one or more of the plurality of operational metrics to a remote monitor communicatively connected to the apparatus through a network and responsively receive a command generated by the remote monitor;
    analyzer circuitry to generate a threat level based at least in part on the plurality of operational metrics, wherein generating the threat level by the analyzer circuitry comprises:
        receiving the plurality of operational metrics from the plurality of sensors over an epoch period;
        normalizing the plurality of operational metrics to create normalized operational metrics;
        creating a matrix of cross-correlation values based on the normalized operational metrics;
        feeding a plurality of cross-correlation matrices collected over a plurality of epochs into a neural network, the neural network to generate a generated threat level based on the plurality of cross-correlation matrices; and
        outputting the generated threat level when the generated threat level is not overridden by the command from the remote monitor and outputting a second threat level indicated by the command from the remote monitor when the generated threat level is overridden by the command from the remote monitor; and
    threat responder circuitry to perform a derating action based on the generated threat level or the second threat level, wherein the derating action to be performed by the threat responder circuitry respective to each threat level is specified by a pre-defined policy set by a manufacturer of the apparatus.

2. The apparatus of claim 1, wherein the command from the remote monitor is generated by the remote monitor based, at least in part, on the one or more of the plurality of operational metrics.

3. The apparatus of claim 1, wherein the command from the remote monitor is generated based on information obtained independently by the remote monitor and not based on the one or more of the plurality of operational metrics.

4. The apparatus of claim 1, wherein the derating action to be performed by the threat responder circuitry comprises enabling or disabling a functionality on the apparatus.

5. The apparatus of claim 1, wherein the derating action to be performed by the threat responder circuitry comprises maintaining existing functionalities in the apparatus.

6. The apparatus of claim 1, wherein the generated threat level outputted by the analyzer circuitry is one of kill, maim, cripple, stasis, or nurture.

7. The apparatus of claim 1, wherein the analyzer circuitry comprises a neural network.

8. The apparatus of claim 1, wherein the plurality of sensors comprises geo-locator, temperature sensor, voltage droop monitor, and/or IP address detector.

9. The apparatus of claim 1, wherein the plurality of operational metrics tracked by the plurality of sensors comprises geographic coordinates of the apparatus, operational temperature of the apparatus, voltage consumed by the apparatus, and/or IP addresses used by the apparatus.

10. The apparatus of claim 1, wherein the threat responder circuitry performs the derating action by using a cripple circuit, a blow fuse, or a degrading signal.

11. A method implemented in a monitored device, the monitored device being a computer processor, the method comprising:

tracking a plurality of operational metrics relating to the monitored device;
sending one or more of the plurality of operational metrics to a remote monitor communicatively connected to the monitored device through a network and responsively receiving a command generated by the remote monitor;
generating a threat level based at least in part on the plurality of operational metrics and the command,
wherein generating the threat level comprises:
receiving the plurality of operational metrics from the plurality of sensors over an epoch period;
normalizing the plurality of operational metrics to create normalized operational metrics;
creating a matrix of cross-correlation values based on the normalized operational metrics;
feeding a plurality of cross-correlation matrices collected over a plurality of epochs into a neural network, the neural network to generate a generated threat level based on the plurality of cross-correlation matrices; and
outputting the generated threat level when the generated threat level is not overridden by the command from the remote monitor and outputting a second threat level indicated by the command from the remote monitor when the generated threat level is overridden by the command from the remote monitor; and
performing a derating action based on the generated threat level or the second threat level, wherein the derating action to be performed respective to each threat level is specified by a pre-defined policy set by a manufacturer of the monitored device.

12. The method of claim 11, wherein the command from the remote monitor is generated by the remote monitor based, at least in part, on the one or more of the plurality of operational metrics.

13. The method of claim 11, wherein the command from the remote monitor is generated based on information obtained independently by the remote monitor and not based on the one or more of the plurality of operational metrics.

14. The method of claim 11, wherein performing the derating action comprises enabling or disabling a functionality of the monitored device.

15. The method of claim 11, wherein performing the derating action comprises maintaining existing functionalities on the monitored device.

16. The method of claim 11, wherein the generated threat level comprises one of kill, maim, cripple, stasis, or nurture.

17. The method of claim 11, wherein tracking the plurality of operational metrics relating to the monitored device comprises:

determining geographic coordinates of the monitored device;
measuring operational temperature of the monitored device;
measuring voltage consumed by the monitored device; and/or
tracking IP addresses used by the monitored device.

18. The method of claim 11, wherein performing the derating action comprises crippling a circuit, blowing a fuse, and/or degrading a signal.

19. A system comprising:
a remote monitor;
a monitored device communicatively connected to the remote monitor through a network, the monitored device being a computer hardware processor and comprising one or more processor cores, the monitored device is to:
track a plurality of operational metrics on the monitored device;
send one or more of the plurality of operational metrics to the remote monitor and responsively receive a command generated by the remote monitor;
generate, via an analyzer circuitry within the monitored device, a threat level based at least in part on the plurality of operational metrics, wherein generating the threat level by the analyzer circuitry comprises:
receiving the plurality of operational metrics from the plurality of sensors over an epoch period;
normalizing the plurality of operational metrics to create normalized operational metrics;
creating a matrix of cross-correlation values based on the normalized operational metrics;
feeding a plurality of cross-correlation matrices collected over a plurality of epochs into a neural network, the neural network to generate a generated threat level based on the plurality of cross-correlation matrices; and
outputting the generated threat level when the generated threat level is not overridden by the command from the remote monitor and outputting a second threat level indicated by the command from the remote monitor when the generated threat level is overridden by the command from the remote monitor; and
perform, via threat responder circuitry within the monitored device, a derating action based on the generated threat level or the second threat level, wherein the derating action to be performed respective to each threat level is specified by a pre-defined policy set by a manufacturer of the monitored device.

* * * * *